(12) United States Patent
Wong et al.

(10) Patent No.: US 7,885,336 B2
(45) Date of Patent: Feb. 8, 2011

(54) PROGRAMMABLE SHADER-BASED MOTION COMPENSATION APPARATUS AND METHOD

(75) Inventors: Daniel W. Wong, Thornhill (CA); Henry H. Law, Scarborough (CA)

(73) Assignee: ATI Technologies ULC, Markham, Ontario (CA)

( * ) Notice: Subject to any disclaimer, the term of this patent is extended or adjusted under 35 U.S.C. 154(b) by 721 days.

(21) Appl. No.: 10/306,075

(22) Filed: Nov. 27, 2002

(65) Prior Publication Data

US 2004/0101056 A1 May 27, 2004

Related U.S. Application Data

(63) Continuation-in-part of application No. 09/777,252, filed on Feb. 5, 2001, now Pat. No. 6,873,735.

(51) Int. Cl.
*H04B 1/66* (2006.01)

(52) U.S. Cl. .................................. 375/240.25

(58) Field of Classification Search ............ 375/240.24, 375/240.25, 240.26, 240.12, 240.29, 240.16, 375/240.17; 345/473, 582, 418, 422, 503; 382/248, 233; 714/48; *H04B 1/66*
See application file for complete search history.

(56) References Cited

U.S. PATENT DOCUMENTS

| | | | |
|---|---|---|---|
| 4,599,608 A | 7/1986 | Matsuoka | |
| 5,095,374 A | 3/1992 | Klein et al. | |
| 5,138,615 A | 8/1992 | Lamport et al. | |
| 5,151,784 A | 9/1992 | Lavagetto et al. | |
| 5,216,503 A | 6/1993 | Paik et al. | |
| 5,355,378 A | 10/1994 | Ohta | |
| 5,461,421 A | 10/1995 | Moon | |
| 5,467,133 A | 11/1995 | Lee | |
| 5,657,277 A | 8/1997 | Shirley | |
| 5,809,173 A | 9/1998 | Liu et al. | |
| 5,818,533 A | 10/1998 | Auld et al. | |
| 5,832,003 A | 11/1998 | Elkind | |
| 5,835,691 A | 11/1998 | Matsunoshita | |
| 5,953,457 A | 9/1999 | Tucker et al. | |
| 5,977,997 A | 11/1999 | Vainsencher | |
| 5,990,958 A | 11/1999 | Bheda et al. | |
| 6,130,911 A | 10/2000 | Lei | |
| 6,141,420 A | 10/2000 | Vanstone et al. | |
| 6,208,350 B1 * | 3/2001 | Herrera | 345/582 |
| 6,256,422 B1 | 7/2001 | Mitchell et al. | |
| 6,275,239 B1 * | 8/2001 | Ezer et al. | 345/473 |

(Continued)

OTHER PUBLICATIONS

Pieters, Bart et al.; Motion Compensation and Reconstruction of H.264/AVC-coded Pictures using the GPU; IBBT; pp. 1-2.

(Continued)

*Primary Examiner*—Tung Vo
(74) *Attorney, Agent, or Firm*—Vedder Price P.C.

(57) ABSTRACT

A video decoding method and apparatus receives a motion compensation shader command, such as a packet, for a programmable shader of a 3D pipeline, such as programmable vertex shaders and pixel shaders, to provide motion compensation for encoded video, and decode the encoded video using the programmable shader of the 3D pipeline. As such, the programmable shader of a 3D pipeline is used to provide motion compensated video decoding as opposed to, for example, dedicated hardware, thereby, among other advantages, eliminating the need for the dedicated hardware.

43 Claims, 12 Drawing Sheets

U.S. PATENT DOCUMENTS

| | | | |
|---|---|---|---|
| 6,310,888 B1 | 10/2001 | Hamlin | |
| 6,404,817 B1 | 6/2002 | Saha et al. | |
| 6,490,324 B1 | 12/2002 | McDade et al. | |
| 6,490,624 B1 | 12/2002 | Sampson et al. | |
| 6,518,974 B2 * | 2/2003 | Taylor et al. | 345/582 |
| 6,538,658 B1 * | 3/2003 | Herrera | 345/582 |
| 6,615,375 B1 | 9/2003 | Mounes-Toussi et al. | |
| 6,621,490 B1 * | 9/2003 | Frank et al. | 345/418 |
| 6,873,735 B1 * | 3/2005 | Aleksic et al. | 382/233 |
| 6,928,165 B1 | 8/2005 | Takai | |
| 6,952,211 B1 * | 10/2005 | Cote et al. | 345/473 |
| 7,035,470 B2 | 4/2006 | Wong et al. | |
| 7,263,231 B2 * | 8/2007 | Jiang et al. | 382/233 |
| 2002/0041626 A1 | 4/2002 | Yoshioka et al. | |
| 2002/0108078 A1 * | 8/2002 | Wong et al. | 714/48 |
| 2003/0043918 A1 * | 3/2003 | Jiang et al. | 375/240.25 |
| 2003/0063087 A1 * | 4/2003 | Doyle et al. | 345/422 |
| 2003/0133619 A1 * | 7/2003 | Wong et al. | 382/248 |
| 2003/0184549 A1 * | 10/2003 | Kim et al. | 345/503 |

OTHER PUBLICATIONS

Shen, Guobin et al.; Accelerating Video Decoding Using GPU; IEEE; 2003; pp. 772-775.

* cited by examiner

PROGRAMMABLE SHADER-BASED MOTION COMPENSATION APPARATUS AND METHOD

RELATED CO-PENDING APPLICATION

This application is a continuation-in-part of and previously with application Ser. No. 09/777,252, now U.S. Pat. No. 6,873,735 entitled "SYSTEM FOR IMPROVED EFFICIENCY IN MOTION COMPENSATED VIDEO PROCESSING AND METHOD THEREOF", having as inventors Aleksic et al.

FIELD OF THE INVENTION

The present invention relates generally to processing video and more particularly to processing motion compensated video.

BACKGROUND OF THE INVENTION

Digital video is generally processed in sets of video frames. Each frame is a still image representing an instant in time of the video being processed. Each frame can further be broken down into blocks. The blocks are individually transmitted and then recombined to form a frame. The amount of data needed to represent the image blocks can become large. Motion compensation can be used to reduce the amount of data needed to represent the image blocks.

Using motion compensation, image blocks can be represented by motion compensation vectors and error data. Motion compensation vectors are used on prediction frames. For example, an object in one frame may simply be displaced either partially or fully into in a new frame. Accordingly, the image blocks used to represent the object in the new frame may be processed with motion vectors, using the image blocks in the original frame as reference. The motion vectors provide the direction and distance in which the referenced image blocks have moved to in the new, or predicted, frame. While the motion vectors may track an object, the temporal compression achieved by motion compensation is intended to reduce the bits required to reproduce the error term, and as such need not necessarily track a specific object.

In some cases, motion compensation vectors are all that are needed to reproduce an image block. However, in many situations, some error exists between the referenced image blocks and the blocks in the predicted frame. Error data can be sent to recover the differences and adequately generate the image block. The error data itself is basic image information, including the luminance of the pixels within the image block. A transform, such as a discrete cosine transform (DCT), can be used to reduce the size of the error data to a transformed data set. The transformed data set includes transfer coefficients, which can then be inverse transformed to reproduce the error data. In some cases, no motion vectors can be generated for a given image block. For example, when a video switches to a new scene none of the objects in the new frame can be referenced to objects in the previous frame. In such a case, the image block is represented only with error data. Furthermore, some reference frames for motion compensation are made up of image blocks represented with only error data. They are referred to as intra-frames, or I-frames. Prediction frames, or P-frames, are motion compensated frames that use previous I- or P-frames for reference. Bi-directional frames can use previous or upcoming I- or P-frames for reference. It should be noted that B-frames are never used as reference themselves to avoid the accumulation of precision errors.

To process the frame data, conventional video processing hardware is used to capture the motion compensation vector data and the error data. The transformed data sets are inverse transformed, such as through an inverse discrete cosine transform (IDCT) component, to accurately reproduce the error data. In some cases, very little or no motion compensation vector data may be present for a given block and most of the data will be related to error data. The hardware must wait for the error data to be fully processed before it can process or receive more motion compensation vector data. The hardware pipeline becomes stalled as it waits for the error data to be processed. In other cases, when reconstruction of an image frame involves mostly motion compensation vector data and few IDCT operations, the IDCT component may become stalled as it waits for the hardware pipeline to process the motion compensation vector data.

Conventional systems force the hardware to be idle when the workloads between the IDCT operations and the motion compensation operations are not well balanced. Stalling the hardware reduces the efficiency with which frames of video are processed and increases the delay in which an image frame can be displayed.

In addition, there are many prediction modes in MPEG video coding and the prediction mode being applied changes from macroblock to macroblock. Graphics processing devices such as graphics chips are known which employ, for example, three separate hardware section in a 3D pipeline. They include a 3D portion, a 2D portion and a separate motion compensation hardware portion to perform the numerous transforms such as IDCT operations as well as a motion compensation prediction. Such dedicated IDCT and motion compensation prediction hardware is typically dedicated hardware, which can process, for example, MPEG II data. However, with different encoding schemes, such implementations may not effectively process encoded video. For example, with MPEG IV, such dedicated MPEG II hardware may not sufficiently decode the encoded video and the additional hardware can increase the cost of the graphics chip. Such previous methods incorporated dedicated hardware within the 3D pipe. It would be desirable to eliminate the need for such hardware.

Graphics chips are also known that use programmable shaders, such as programmable vertex shaders and programmable pixel shaders. The programmable shaders facilitate, for example, shading and other operations for 3D rendering of images based on primitives such as triangles or other objects. Such 3D rendering employs texture maps, as known in the art to apply, for example, textures to surfaces of 3D objects. However, it would be desirable to provide a more efficient processing structure to reduce costs and improve decoding of encoded video.

BRIEF DESCRIPTION OF THE DRAWINGS

Embodiments of the present invention are shown and described in the drawings presented herein. Various objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, and wherein:

DETAILED DESCRIPTION OF THE DRAWINGS

Figure 1:
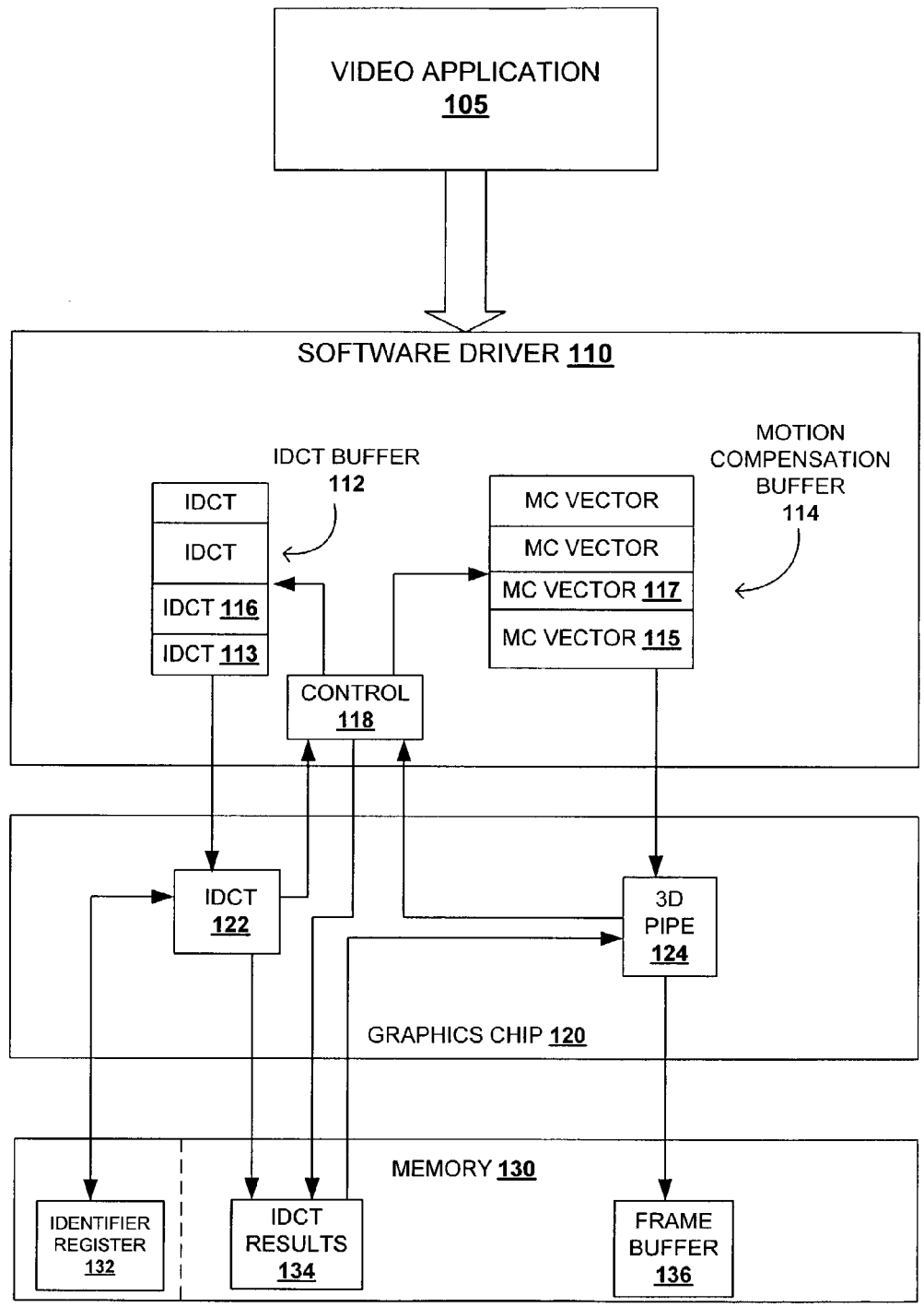
FIG. 1 is a block diagram illustrating a system for handling video data, according to one embodiment of the present invention.

Briefly, a video decoding method and apparatus receives a motion compensation shader command, such as a packet, for a programmable shader of a 3D pipeline, such as programmable vertex shaders and pixel shaders, to provide motion compensation for encoded video, and decode the encoded video using the programmable shader of the 3D pipeline. As such, the programmable shader of a 3D pipeline is used to provide motion compensated video decoding as opposed to, for example, dedicated hardware, thereby, among other advantages, eliminating the need for the dedicated hardware.

In addition, the method and apparatus maps reference video is a reference picture texture map, generates a motion vector texture map based on motion vector data associated with the plurality of macroblocks, maps inverse transform data associated with a plurality of macroblocks as an inverse transform texture map and uses the programmable shader to generate decoded video based on the motion vector texture map, the reference texture and the inverse transform texture map as needed. As such, the new texture maps are created for motion compensation prediction and video decoding so that 3D shader circuitry can be used to provide motion compensation prediction and subsequent video decoding.

In the embodiment, the motion compensation shader command contains data representing macroblock corners associated with a plurality of video macroblocks and a plurality of shader code modules necessary for different prediction modes associated with the video macroblocks. Hence, the motion compensation command itself contains shader code modules necessary for different prediction modes. These shader code modules are then stored. Subsequent macroblocks that need to be processed may receive motion compensation commands that include pointers to the stored motion compensation shader code modules and cause the programmable shader to execute one of the plurality of stored shader code modules that were previously sent or currently sent as part of the motion compensation command. As such, since typically only one prediction mode is activated at any given time, for a macroblock whenever there is a change in prediction mode, a program counter may be updated to point to an active shader code module. Hence, a small number of texture commands may be used and ALU commands may be used to accommodate a multitude of prediction modes, which may be preloaded into the graphics processor to speed up prediction mode switching for the decode/encode process. Other advantages will be recognized by those of ordinary skill in the art.

Also, at least one embodiment of the present invention provides a method for processing image data. The method includes receiving IDCT data. The IDCT data is inverse discrete cosine transform coefficients related to a set of image data. The method also includes processing the IDCT data to generate IDCT results. The method includes receiving motion compensation vector data. The motion compensation vector data is related to the set of image data. The method includes retrieving the inverse transformed results related to the set of image data, based upon receiving the motion compensation vector data. The method further includes processing the motion compensation vector data and the IDCT results to generate at least part of an image.

Referring now to FIG. 1, a video processing system for collecting and processing motion compensation video data is shown, according to one embodiment of the present invention. In one embodiment, the video processing system is part of an information handling system. Software driver 110 is part of software located in memory, a computer readable medium storing instructions within the information handling system, run with a central processing unit (CPU-not shown). Software driver 110 handles video requests generated by an application program, such as video application 105, and routes the video requests to graphics chip 120 where they can be processed. Video application 105 can include video applications such as digital video disk (DVD) player software, a digital television tuner, an application programming interface (API), or video decoding software.

In one embodiment, when using motion compensation techniques to display video images, video information related to a new block of image data within a frame of video is temporal-wise compressed using motion compensation (MC) vectors. Blocks in a new frame are compared to blocks in a reference frame. For example, objects in the reference frame may simply move or be displaced in the new frame. Therefore, a MC vector, indicating the direction and distance, can be used to describe where the blocks representing the object should be in the new frame. MC vectors may not always be enough to represent the block in the new, or predicted, frame. Differences between the block in the reference frame and the block in the new frame are transmitted as error data.

Error data is generally image data, including pixel information to reproduce any image information not covered using MC vectors. The error data can be compressed using a discrete cosine transform (DCT). The DCT is a discrete orthogonal transformation between a time and frequency domain. Generally a forward DCT (FDCT) is performed on the error data to generate transform coefficients, allowing an inverse DCT (IDCT) to later be used on the coefficients to restore the error data from the DCT results. The error data can correct for any image information left out using the MC vectors. Some blocks, even in predicted frames, may be sent using only transformed error data, without any corresponding MC vectors.

The DCT results and MC data can be received through video application 105. Video application 105 can be an application programming interface (API), or a device driver interface (DDI), such as a DirectX Video Acceleration API/DDI. The results of the DCT can be further compressed using run-length coding, wherein the number of zeroes between values are delivered as discrete values between the coefficients. The video data, DCT results and MC vector data, are then sent by the API/DDI to a software driver, such as software driver 110.

Software driver 110 receives the video data from video application 105 and may decode the data if necessary, such as through a run-length decoder. In one embodiment, the DCT results are quantized when generated by the DCT. Accordingly, the values can be de-quantized to obtain a better representation of original video data. The DCT results can be used as IDCT coefficients by an inverse transform component, such as IDCT component 122, to reproduce the error data. Accordingly, the DCT results are stored in an IDCT buffer 112. The MC vector data is stored in a MC buffer 114. Sets of the IDCT coefficients and the MC vector data are related to the same portions of an image and must be processed together. For example, IDCT coefficients set 113 and MC vector set 115 relate to the same image portion. IDCT coefficients set 116 and MC vector set 117 relate to another image portion.

To track the relations between the IDCT coefficients and the MC data, a unique identifier is applied to each IDCT and MC vector set. In one embodiment, IDCT coefficients set 113 and MC vector set 115 are given one identifier; while, IDCT coefficients set 116 and MC vector set 117 are given another identifier. The identifier can be any unique value assigned to the data sets, such as a value which changes after each data set, such as from a counter, or a timestamp indicating when the data was received, such as from a clock. In one embodiment, the image portion represented by IDCT coefficients sets 113 and 116 and the MC data sets 115 and 117 include a block of image data, wherein a block can represent a portion of image data covering a space of eight by eight pixels. In another embodiment, the image portion includes a macroblock covering an image space of sixteen by sixteen pixels. It will be appreciated that other image portion sizes can be used and the size of the image portion represented can be altered without departing from the scope of the present invention.

The IDCT coefficients are then processed by an inverse transform, such as IDCT component 122, to generate the error data for the image block being represented. In at least one embodiment, when MC data from MC buffer 114 is to be processed by hardware, such as 3D pipe 124 on graphics chip 120, the corresponding error data must also be presented. Therefore, before the MC data related to an image portion is provided to 3D pipe 124, on graphics chip 120, the IDCT coefficient data related to the image portion is presented to IDCT component 122 on graphics chip 120. In one embodiment, graphics chip 120 represents a monolithic semiconductor device used for processing video data.

In one embodiment, IDCT coefficients set 113 is sent to IDCT component 122 of graphics chip 120. IDCT component 122 stores the unique identifier associated with IDCT coefficients set 113 in an identifier register 132. IDCT component 122 then performs an inverse transform to generate the error data represented by IDCT coefficients set 113. In one embodiment, the inverse transform includes an inverse discrete cosine transform. Identifier register 132 can be a hardware register in graphics chip 120. Alternatively, identifier register 132 may be a part of system memory in the information handling system, as illustrated in FIG. 1.

The results generated by IDCT component 122, are stored in IDCT results 134. IDCT results 134 represent a portion of external memory. As described herein, external memory is used to describe system or cache memory such as random access memory (RAM) or a first in first out (FIFO) memory array which is not a part of 3D pipe 124 or IDCT component 122. In comparison, a register is used herein to refer to internal hardware components used to store specific values within the hardware components, such as IDCT component 122 and 3d pipe 124. In one embodiment, IDCT results 134 represent a frame buffer used to store error data. In another embodiment, IDCT results 134 are stored in cache memory. IDCT component 122 sends an interrupt to control 118 of software driver 110. The interrupt indicates that IDCT component 122 has completed processing the IDCT coefficients, such as IDCT coefficients set 113. In one embodiment, the interrupt includes the unique identifier stored in identifier register 132. The unique identifier is used to indicate which IDCT coefficients were processed. Software driver 110 may use the unique identifier to determine the corresponding sets of MC vector data in MC buffer 114 to send.

MC vector data sets, such as MC vector set 115, corresponding to the processed IDCT coefficients blocks are sent by software driver 110 to a motion compensation processing component, such as 3D pipe 124. In one embodiment, 3D pipe 124 receives a memory address with the MC vector data sets to indicate where to read the error data, stored in IDCT results 134, related to the MC vector data sets. 3D pipe 124 processes the MC vector data along with the error data retrieved from memory to generate image data. The processed image data can be stored in frame buffer 136. Frame buffer 136 can be represented by a location in memory 130 or in hardware, such as in graphics chip 120. Alternatively, the processed image data can be delivered to a display device. In one embodiment, a prediction plane is obtained based on the motion compensation vector data and a reference frame. The prediction plane may combine with error data to produce the final image blocks.

It should be noted that 3D pipe 124 is capable of operating asynchronously to IDCT component 122. In one embodiment, the asynchronous nature is based on clocks used to run the components, wherein 3D pipe 124 and IDCT component 122 operate using separate clocks. In another embodiment, the asynchronous nature is based on the relationship between operations within the components, wherein there is no fixed time relationship between the completion of an operation on IDCT component 122 and the initiation of operations on 3D pipe 124. In one embodiment, while 3D pipe is processing the image data related to MC Vector set 115 and the processed error data from IDCT coefficients set 113, IDCT 122 can process a second set of IDCT coefficients, such as IDCT coefficients set 116, sent by software driver 110. However, if software driver 110 detects, such as through control 118, that the memory associated with IDCT results 134 is full of unread data, software driver 110 may restrict the transfer of IDCT coefficients sets until the memory can be cleared.

Once 3D pipe 124 has read the error data stored in IDCT results 134, 3D pipe 124 can send a second interrupt to control 118 in software driver 110. The second interrupt instructs software driver 110 that the data in IDCT results 134 has been read. Software driver 110 can then free the memory space associated with IDCT results 134. Software driver 110 can also send more IDCT coefficients from IDCT buffer 112 to IDCT component 122, allowing IDCT results 134 to be filled with new error data, while 3D pipe 124 is busy processing the received image data. Software driver 110 can also use the second interrupt to determine whether to display any completed image frames or portions of image frames.

In one embodiment, several sets of IDCT coefficients are sent to IDCT component 122 for processing. For example, IDCT coefficient sets 113 and 116 can be processed by IDCT component 122. The error data associated to the image portions represented by IDCT coefficient sets 113 and 116 can be saved as different portions of memory in IDCT results 134. If 3D pipe 124 is busy processing other image data, IDCT 122 can process both IDCT coefficient sets 113 and 116. Once software driver 110 received the unique identifier associated with IDCT coefficients set 116, through an interrupt on control 118, software driver 110 can send both MC data sets 115 and 117, recognizing that the respective IDCT coefficients sets 113 and 116 have already been processed. As discussed in FIGS. 4 and 5, several methods may be employed to optimize video processing for image portions associated mostly with error data or with motion compensation data.

In one embodiment, all data sent between software driver 110 and graphics chip 120 is encoded or scrambled to protect the video content represented. For example, the IDCT coefficients sent to IDCT component 122 and the motion compensation vector data sent to 3D pipe 124 is scrambled on software driver 110. Accordingly, graphics chip 120 would de-scramble the content, through a de-scrambling component (not shown), before it is processed by respective components. As previously discussed, the system described herein may be part of an information handling system. The term "information handling system" refers to any system that is capable of processing information or transferring information from one source to another. An information handling system may be a single device, such as a computer, a personal digital assistant (PDA), a hand held computing device, a cable set-top box, an Internet capable device, such as a cellular phone, and the like. Alternatively, an information handling system may refer to a collection of such devices.

Figure 2:
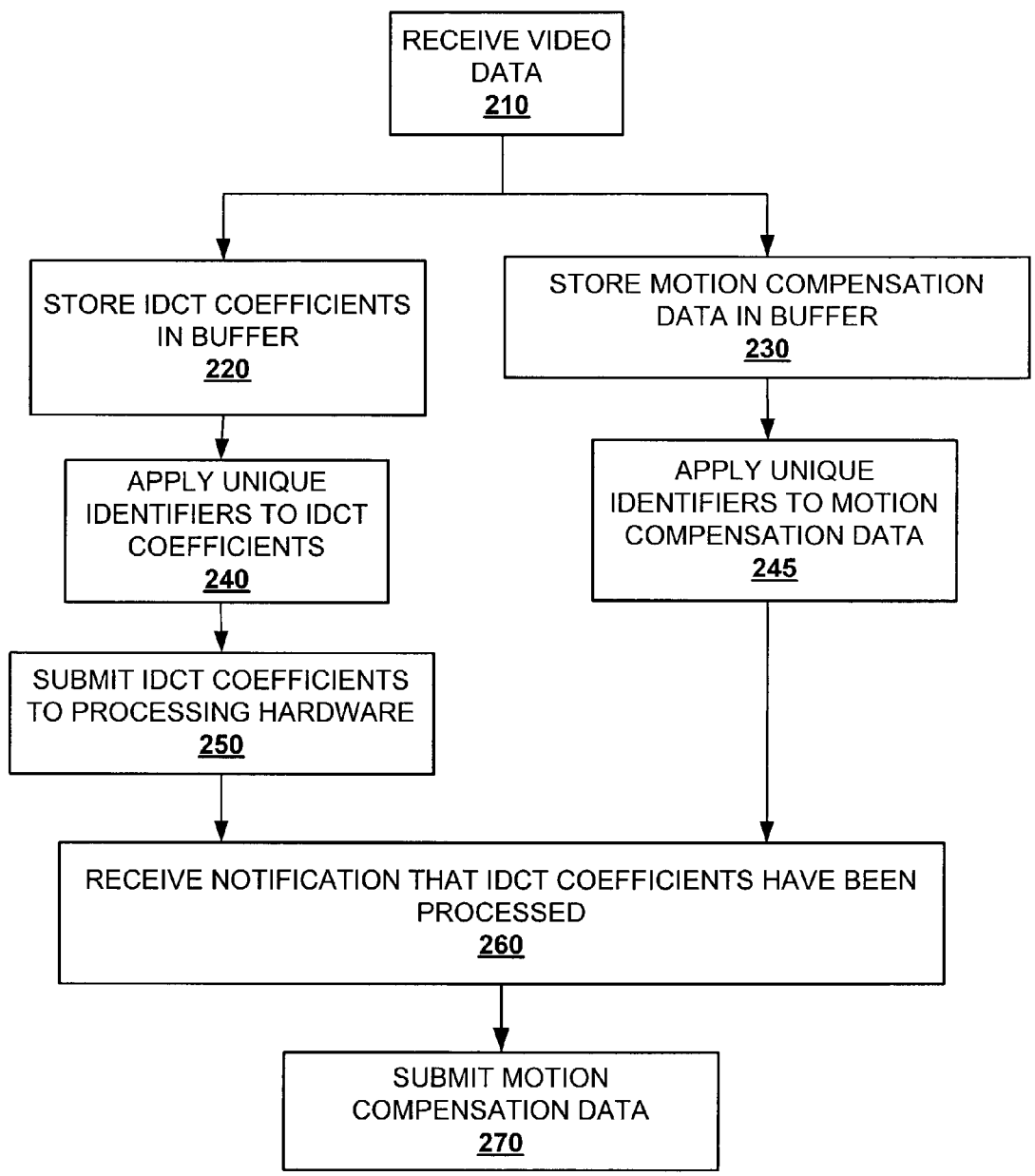
FIG. 2 is a flow diagram illustrating the steps for handling image data in a software driver, according to one embodiment of the present invention.

Referring now to FIG. 2, a flow chart of a method for a software driver to handle video data for delivery to a video processing hardware is shown, according to one embodiment of the present invention. As previously discussed, individual images of video are temporal-wise compressed using motion compensation. In one embodiment, the image is broken down into blocks of pixel elements. A target block in a target frame is compared to a reference frame and motion compensation vectors are generated indicating the displacement of a reference block in the reference frame that best describes the target block. Differences between the target block and the reference block are transformed using a discrete cosine transform (DCT). The transformed data are used as coefficients for an inverse DCT (IDCT). In one embodiment, a block refers to an eight by eight set of pixels. As previously discussed, the image can also be broken down into multiple sixteen by sixteen macroblocks of pixels. It will be appreciated that the image can be broken down into portions with sizes other than those discussed herein, without departing from the scope of the present invention.

In step 210, the software driver receives the video data, including motion compensation vectors and IDCT coefficients. Processing may be needed to handle the video data appropriately. For example, in one embodiment, the IDCT coefficients are compressed using run-length coding. Accordingly, a run-length decoding component of the software driver may be required to decode the IDCT coefficients. The video data may also be de-quantized, since many of the IDCT coefficients may be quantized to reduce bandwidth requirements. Quantization may cause unfavorable image artifacts when recreating the image. Therefore, further processing, such as image filtering, may be needed along with de-quantization to reduce the artifacts due to DCT quantization.

In step 220, the software driver stores the IDCT coefficients in a memory buffer. In step 230, the corresponding motion compensation vector data is also stored in a memory buffer. As previously discussed, the IDCT coefficients may relate to the same portion of an image as the motion compensation vector data. In one embodiment, the error data related to the IDCT coefficients must be processed with the motion compensation vector data. Accordingly, the software driver generates a unique identifier for tracking the IDCT coefficients and motion compensation vector data related to the same image portion. In step 240, the unique identifier is applied to the IDCT coefficients. In step 245, the unique identifier is applied to the motion compensation vector data related to the IDCT coefficients. The unique identifier may be used to identify and preserve the relationship between the motion compensation vector data and corresponding IDCT coefficients, representing the error data. In step 250, the software driver submits IDCT coefficients stored in the IDCT buffer to processing hardware. As previously discussed, the processing hardware performs an inverse transform on the IDCT coefficients to reproduce image error data.

In step 260, the software driver receives a notification from the processing hardware. The notification indicates that the processing hardware has completed processing at least some of the IDCT coefficients sent in step 240, and stored the processed error data in memory. The notification also indicates that the processing hardware is ready to receive motion compensation vector data to process the image block associated with the processed IDCT coefficients. In one embodiment, the notification sent is an interrupt generated by the processing hardware.

In step 270, the software driver submits motion compensation vector data stored in the motion compensation buffer to the processing hardware. The notification received in step 260 includes the unique identifier associated with the processed error data. By noting the unique identifier, the software driver identifies which of the stored motion compensation vector data to submit. The software driver may use the notification to locate the address of the processed error data stored in memory, related to the motion compensation vector data. In one embodiment, the software driver sends the memory address in which the processed error data can be accessed. The processing hardware can then read the memory address to access the error data for processing with the motion compensation vector data. The processing hardware processes the motion compensation vector data with the error data to generate the associated image block.

While the hardware is busy processing the motion compensation vector data and the error data, the software driver can continue to submit more IDCT coefficients to be processed, as in step 250. However, if the memory where the processed error data is stored is full, the software driver must wait until the hardware has read the processed error data. In one embodiment, the hardware sends a second notification to the software driver. Once the processing hardware has read the error data from memory, the processing hardware sends the second notification to the software driver. Once it receives the second notification, the software driver can free up the memory where the error data is being stored, allowing new error data to be stored. The notification indicates that additional IDCT coefficients can be sent to the processing hardware. In one embodiment, the second notification is an interrupt generated by the processing hardware.

Figure 3:
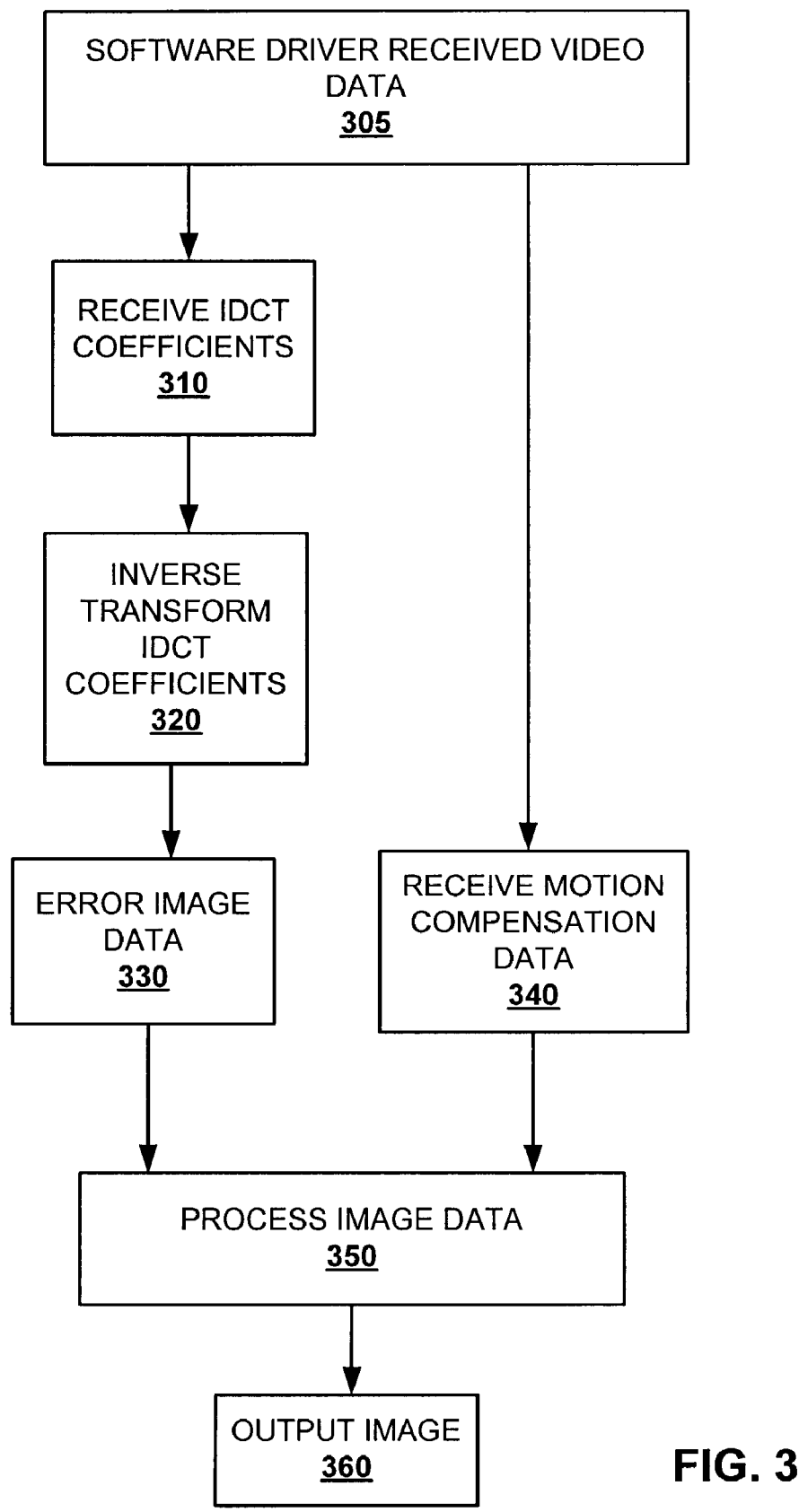
FIG. 3 is a flow diagram illustrating the steps for processing video data in hardware, according to one embodiment of the present invention.

Referring now to FIG. 3, a flow chart illustrating a method of processing data related to video in hardware is shown, according to at least one embodiment of the present invention. In step 305, a software driver receives the video data. The transformed results, IDCT coefficients, and the motion compensation vectors are stored in buffers by the software driver, storing motion compensation data for several image blocks. In one embodiment, the data is stored until the video processing hardware is ready to process more video data.

In step 310, the video processing hardware receives sets of IDCT coefficients from the software driver. The IDCT coefficients are passed along to an IDCT component, such as IDCT component 122 (FIG. 1). In step 320, the IDCT component begins to process the IDCT coefficients. The IDCT coefficients are used to reproduce the error image data represented by the IDCT coefficients. In one embodiment, the IDCT component stores a unique identifier associated with the IDCT coefficients. The unique identifier allows the processing hardware to notify the software driver from step 305 which of the IDCT results is ready to be processed, allowing the software driver to send corresponding motion compensation data. In one embodiment, the notification to the software driver is sent as an interrupt. In step 330, the processed IDCT data is stored as error data. As previously discussed, the error data may be stored in system memory or in a frame buffer.

In step 340, the processing hardware receives motion compensation vector data from the software driver. In at least one embodiment, the motion compensation vector data corresponds to the same image block as the processed error image data stored in step 330. In one embodiment, the processing hardware uses a unique identifier associated with the received motion compensation vector data to determine where the stored error data the motion compensation vector data is associated with is stored. For example, in one embodiment, the memory address in which the associated error data is stored is passed along with the motion compensation vector data. The processing hardware simply reads the address provided by the software driver.

It should be noted that the IDCT component used to process the IDCT coefficients and the processing hardware used to process the motion compensation vector data can operate asynchronously. The software driver is used to coordinate and synchronize the activities of the IDCT component and the processing hardware. For example, while the processing hardware is busy processing a set of motion compensation vector data, the software driver can send more IDCT coefficients to be processed by the IDCT component. However, the memory used to store the processed error data related to the IDCT coefficients may become full. In one embodiment, the processing hardware sends an interrupt to the software driver to indicate that the error data has been read, allowing the memory to be cleared and more IDCT coefficients to be sent and processed. In step 350, the motion compensation vector data and the error image data are processed together to generate at least a portion of an image. In step 360, the generated image portion is output. In one embodiment, the image portion is output to a frame buffer in memory. In another embodiment, the image portion is output to a display device where it is displayed as a portion of an image. It will be appreciated that enough data to process an entire image frame or sets of image frames may be processed and output. In one embodiment, all data submitted to hardware, steps 250 and 270, is scrambled to protect the content represented by the data.

Figure 4:
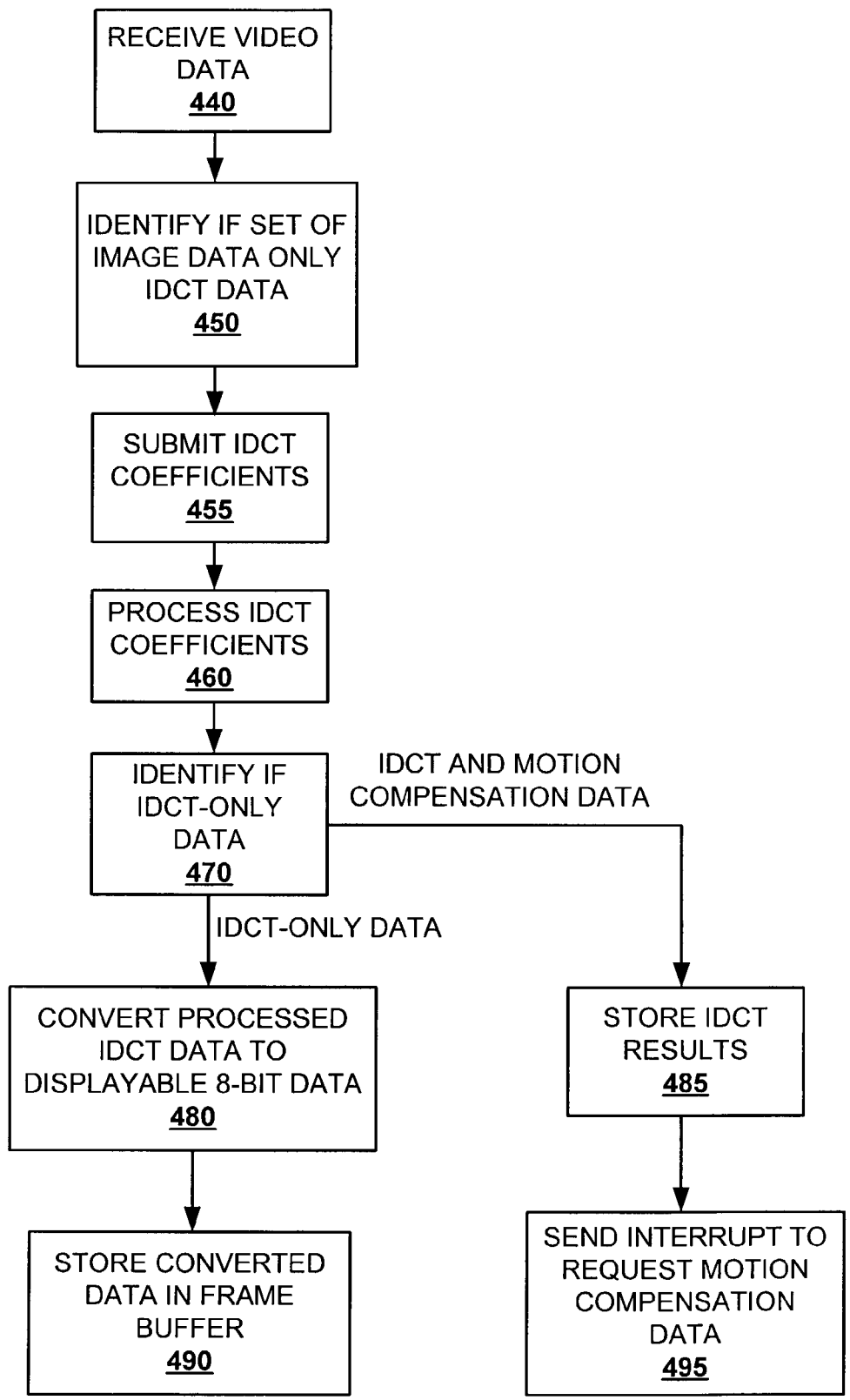
FIG. 4 is a flow diagram illustrating steps for optimizing image processing for image data associated with only inverse discrete cosine transform (IDCT) data, according to one embodiment of the present invention.

Referring now to FIG. 4, a method of optimizing video processing for image data containing only IDCT data is shown, according to one embodiment of the present invention. As previously discussed, motion compensation video data generally consists of error data and motion compensation vector data. The error data is compressed into IDCT coefficients. Occasionally, video data will consist of only IDCT coefficients. Since no associated motion compensation vectors are provided, 3D pipe 124 (FIG. 1) is not needed for processing the image data. Since the processed IDCT data can be provided directly to frame buffer 136 (FIG. 1), the memory space for IDCT results 134 (FIG. 1) is also not needed.

In step 440, a software driver receives image data associated with a block of an image frame. As previously discussed, the software driver may perform processing on the received image data. For example, run-length decoding or de-quantization may be necessary for processing the image data. In step 450, the software driver identifies if the image data only has IDCT coefficient data associated with it. In one embodiment, the software driver identifies the IDCT-only image data when the image frame to be processed is an I-frame.

As previously discussed, portions of a single image frame may be stored as separate blocks of data, wherein the data includes Luma (Y) data and Chroma (UV) data. Compression of the data within a single block may be performed using data transformation, such as through the DCT, or by sub-sampling the Y and UV data. Accordingly, further compression may be performed among sets of consecutive frames, or video. A single frame may be compressed through inter-frame coding, wherein differences among blocks of sequential frames are used in data compression. A method of temporal prediction may be used for inter-frame coding of video data. Initially, a set of blocks corresponding to a first frame of data is transmitted. The data may include intra-frame coding among the blocks and the frame is generally referred to as an I-frame. Once the I-frame information has been sent, a frame with prediction data, referred to as a P-frame, may be transmitted. The P-frame data includes prediction vectors for the blocks in the preceding frame, such as motion vectors relating to blocks within a previously sent I-frame or P-frame.

By detecting when an I-frame is processed, the software driver can recognize that the image data is entirely made up of IDCT data. Alternatively, the software driver may determine the image data is entirely made up of IDCT data by analyzing the data packet regarding the image data it receives. In step 455, the IDCT-only data is submitted to an IDCT component, such as IDCT component 122 (FIG. 1), in processing hardware. When submitting the IDCT-only data, the software driver may attach an identifier to the submitted data to indicate that there is no associated motion compensation data, allowing the IDCT component to initiate the optimization techniques described herein.

In step 460, the IDCT component processes the received IDCT coefficients to generate image data from the IDCT coefficients. In step 470, the IDCT component identifies if the IDCT data it processed was IDCT-only or if it had motion compensation data associated with it. The IDCT component may detect IDCT-only data according to an identifier attached to the data by the software driver, as discussed in step 455. If the data is not IDCT-only data, indicating it has associated motion compensation data, the IDCT component may perform according to a first mode of operation, as previously discussed in FIG. 1.

According to the first mode of operation, the IDCT component functions to prepare the IDCT data to be processed along with motion compensation data in a processing component, such as 3D pipe 124 (FIG. 1). Accordingly, in step 485, the IDCT component stores the IDCT results in memory. In one embodiment, the IDCT results are 9-bit values. Due to memory spaces being allocated in 8-bit segments, 16-bit spaces are allocated for the values of the IDCT results. In step 495, the IDCT component sends an interrupt to the software driver indicating that the IDCT data has been processed and to request that the associated motion compensation vector data be sent to the processing hardware. The processing component can then process the motion compensation vector data with the stored IDCT results to generate the image data to store in the frame buffer.

Alternatively, in step 470, the IDCT component may determine the processed IDCT data has no associated motion compensation data. The IDCT component can process the data according to a second mode of operation. In the second mode of operation, the IDCT component can perform optimizations related to IDCT-only image data. The processing component, 3D-pipe 124 (FIG. 1) can be bypassed. The processed IDCT data can also store the IDCT results into frame buffer memory, freeing up the space associated with IDCT results 134 (FIG. 1) in the first mode of operation. However, since the IDCT results are generally 9-bit values, the results must be converted to 8-bit values to store them as displayable image data in the frame buffer. Accordingly, in step 480, the IDCT results are converted to 8-bit values. In one embodiment, converting the results to 8-bits includes adding a bias value to the results and clamping the results to 8-bit values. Following the second mode of operation, in step 490, the converted results are stored directly in the frame buffer. The IDCT component can send a notification to the software driver, notifying it to send more IDCT data or to indicate the stored image frames are ready to be displayed.

Figure 5:
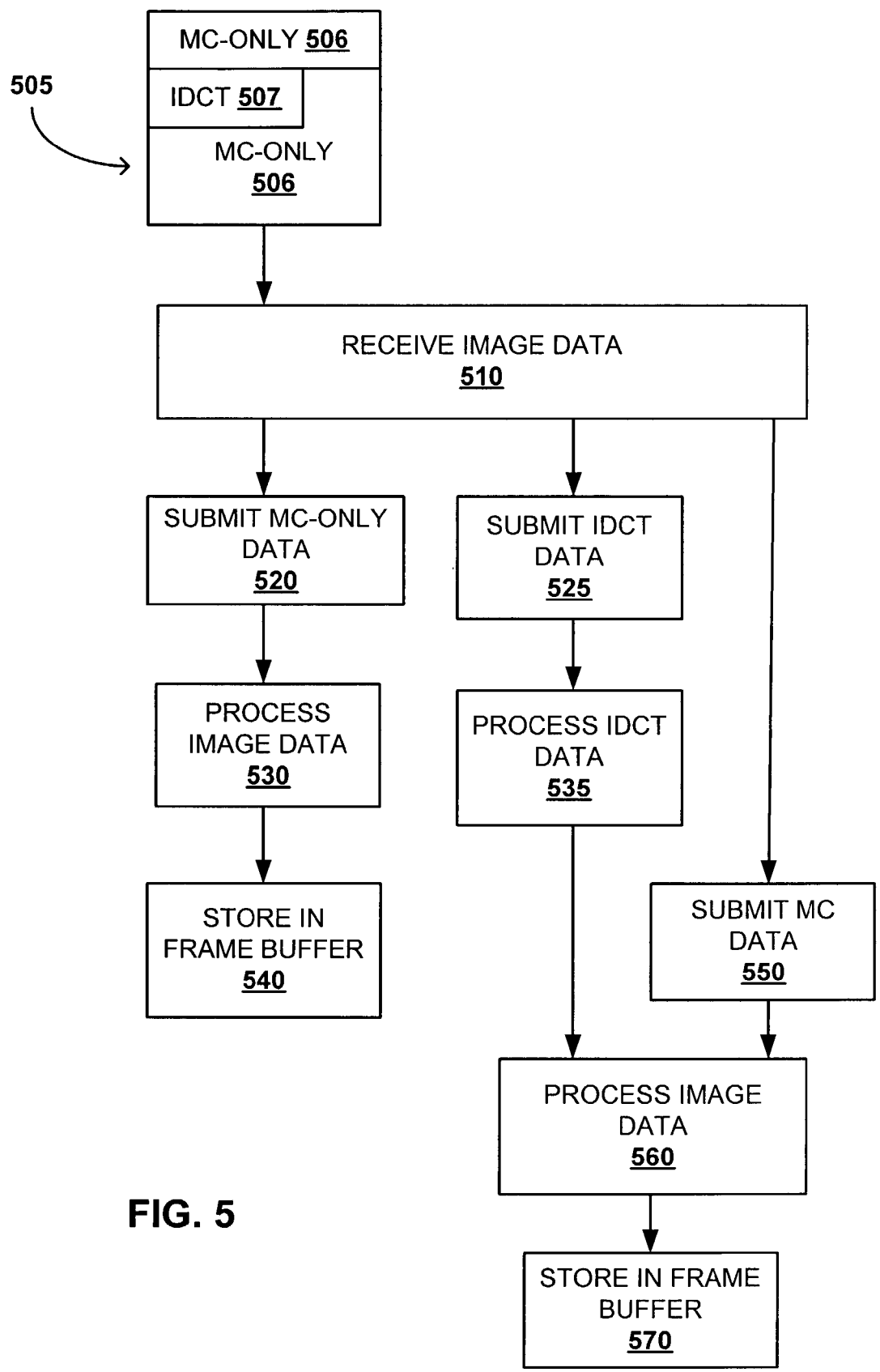
FIG. 5 is a flow diagram illustrating steps for optimizing image processing for image data associated with only motion compensation vector data, according to one embodiment of the present invention.

Referring now to FIG. 5, a flow diagram describing the steps taken to optimize image processing for image data containing only motion compensation data is shown, according to one embodiment of the present invention. As previously discussed, I-frames are used as reference for P-frames and B-frames in motion compensation. P-frames and B-frames can use motion compensation vectors to indicate the motion of a block in a reference frame to the current frame. P-frames and B-frames can also use error data to indicate differences in image information between a referenced block and a current block.

As previously discussed in FIG. 1, error data is represented using IDCT coefficients. The IDCT coefficients are processed by an IDCT component, such as IDCT component 122 (FIG. 1), to reproduce the error data. Motion compensation vector data is processed using a processing component, such as 3D pipe 124 (FIG. 1). In one embodiment, when IDCT coefficients are included with the motion compensation data, the IDCT component must first process the IDCT coefficients. The 3D pipe is then used to process the motion compensation vector data with the processed IDCT results.

A frame of video may be composed of image blocks that are entirely composed of motion vectors, with no error data. For example, the video being represented may be of a simple bouncing ball. If the background does not change, a large portion of the frame can be simply represented using motion compensation vectors. If the ball is the only part of the frame that is changing, only a small subset of blocks would involve both IDCT coefficients and motion compensation vectors. The 3D pipe can then be used to process the pure motion compensation areas without waiting for IDCT results to be processed. In one embodiment, the image data associated with only motion compensation vector data is submitted to the 3D pipe. The motion compensation data with associated IDCT data can be withheld while other motion compensation data is processed, allowing the IDCT coefficients to be processed by the IDCT component, concurrently with other motion compensation data being processed in the 3D pipe.

In step 510, a software driver receives image data referring to blocks within a frame 505. Frame 505 includes blocks that contain only motion compensation vector data, motion compensation only blocks 506. Among motion compensation only blocks 506 is a block with both IDCT coefficients and motion compensation vector data, IDCT block 507. In one embodiment, the received image data is stored in buffers. In step 520, the software driver submits the motion compensation vector data associated with the motion compensation only blocks 506 to the 3D pipe in processing hardware. In step 525, the software driver submits the IDCT coefficients from IDCT block 507 to the IDCT component in the processing hardware. The motion compensation data associated with IDCT block 507 can be withheld in the buffer, allowing the motion compensation blocks 506 to be processed. In step 530 the 3D pipe processes the submitted motion compensation vector data. In step 535, the submitted IDCT data is processed by the IDCT component. In one embodiment, step 535, submitting the IDCT data, is performed concurrently with the motion compensation data being processed in step 530. The processed IDCT data is stored in memory, such as in IDCT results 134 (FIG. 1).

In step 540, after being processed by the 3D pipe, the image data associated with motion compensation blocks 506 are stored in a frame buffer. In step 550, the software driver submits the motion compensation data associated with IDCT block 507 to the 3D pipe. The software driver may include an identifier with the motion compensation vector data, notifying the 3D pipe to read the associated IDCT data that has already been processed by the IDCT component. In one embodiment, the identifier is the address in which the processed IDCT data is stored, allowing the 3D pipe to simply access the provided memory address to read the processed IDCT data. In step 550, the 3D pipe processes the motion compensation vector data submitted in step 550 along with the processed IDCT data from step 535. In step 570, the processed image data related to IDCT block 507 is stored in the frame buffer. By processing the data from the blocks that only contain motion compensation data concurrently with the IDCT data from other blocks, the idle time of the 3D pipe is reduced. Accordingly, the 3D pipe does not wait for completed IDCT results to process image data, allowing it to process other image data.

Figure 6:
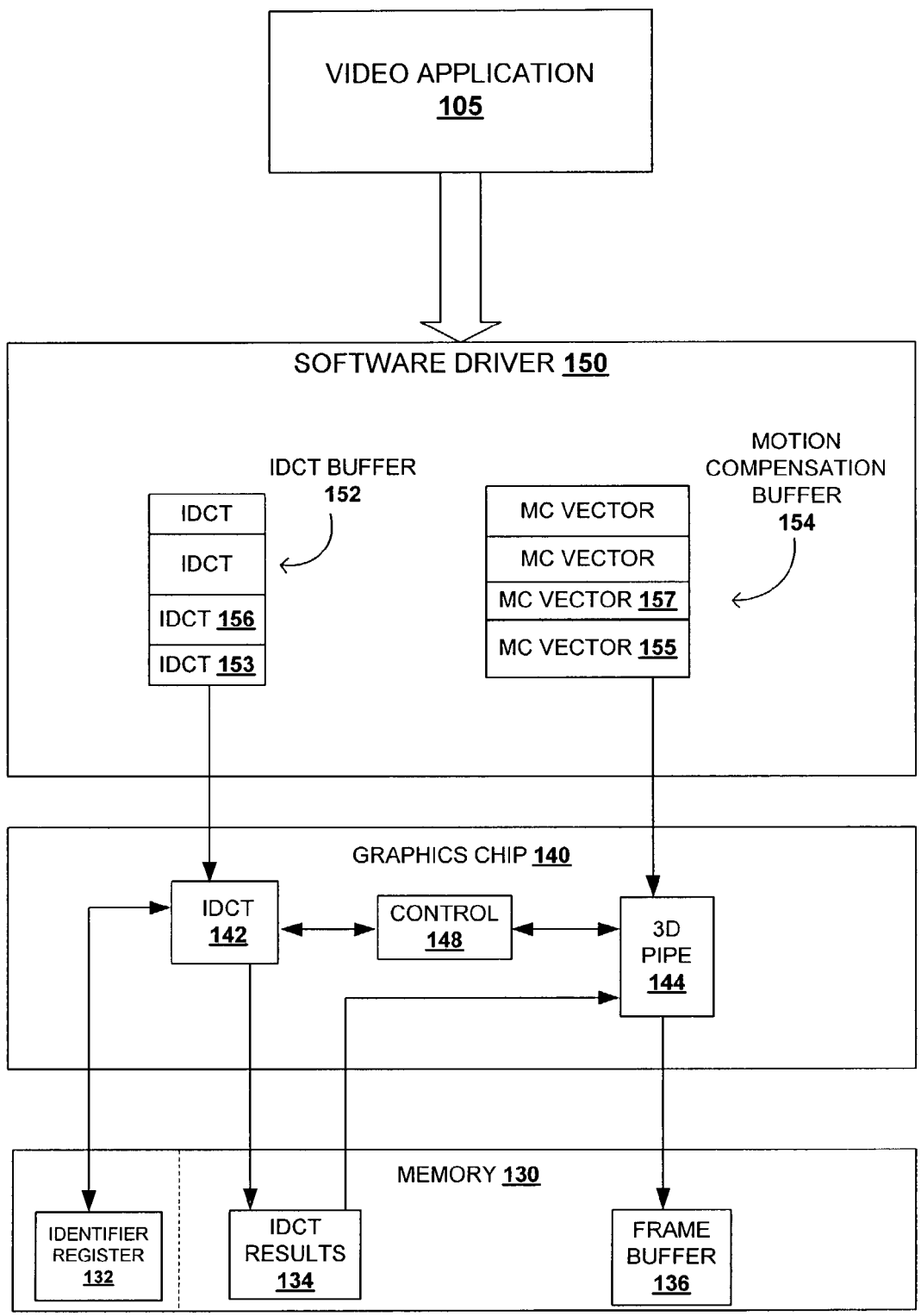
FIG. 6 is a block diagram illustrating a system for handling video data using semaphores, according to one embodiment of the present invention.

Referring now to FIG. 6, a video processing system for collecting and processing motion compensation video data is shown using a semaphore, according to one embodiment of the present invention. Software driver 150 handles video requests generated by an application program, such as video application 105, and routes the video requests to graphics chip 140 where they can be processed. As previously discussed, video application 105 can include video applications such as digital video disk (DVD) player software, a digital television tuner, an application programming interface (API), or video decoding software.

In one embodiment, software driver 150 stores inverse transformed error data, such as IDCT coefficients sets 153 and 156, in an IDCT buffer 152. Software driver 150 stores motion compensation (MC) vector data, such as MC data sets 155 and 157, in an MC buffer 114. The stored inverse transformed error data and MC data are held in buffers 112 and 114, respectively, until being sent to graphics chip 140.

Graphics chip 140 includes an IDCT component 142, similar in function to IDCT component 122 (FIG. 1), for processing IDCT data sets sent from software driver 150. In one embodiment, processed error data from IDCT component 142 is stored in IDCT results 134 of memory 130. Graphics chip 140 also includes a 3D pipe 144, similar in operation to 3D pipe 124 (FIG. 1), for processing MC data sets sent from software driver 150. In one embodiment, 3D pipe 144 processes the MC data sets with processed error data stored in IDCT results 134. Processed video data generated by 3D pipe 144 is stored in a frame buffer 136. As will be discussed further, a control component 148 is used to track the processing of motion compensation vector data and related error data. In one embodiment, control 148 includes a semaphore to halt the processing performed by 3D pipe 144, until error data has been received by IDCT component 142.

Software driver 150 coordinates the delivery of transformed error data to IDCT component 142, as well as the delivery of related motion compensation vector data to 3D pipe 144. According to one embodiment, the motion compensation vector data related to the transformed data cannot be processed until the inverse transformed error data has been processed into error data. In the embodiments described in FIGS. 1-5, interrupt-based methods are described wherein software driver 120 (FIG. 1) is issued interrupts from components 122 and 124 (FIG. 1), indicating when a set of data has been processed. For example, IDCT component 122 may issue an interrupt indicating a unique identifier of processed error data. Using the unique identifier, software driver 110 can issue related motion compensation data to 3D pipe 124.

In an alternate embodiment, semaphore-based methods may be employed, wherein a semaphore in control component 148 is used by components 142 and 144 of graphics chip 140, to track and control the processing of received data. Semaphores describe protected variables, or registers, used to restrict specific processes. Access to alter the value of the semaphore is generally made through specific commands. In one embodiment, software driver 150 includes commands to alter a semaphore value, within graphics chip 140, when submitting transformed error data to IDCT component 142. Software driver 150 also includes a command with the motion compensation vector data indicating to 3D pipe 144 to wait until the value of the semaphore is incremented. For example, software driver 150 sends both sets of transformed error data, such as IDCT coefficients set 153, and motion compensation vector data, such as MC data set 155, to graphics chip 140, including the semaphore commands described.

In one embodiment, while 3D pipe 144 may have received motion compensation vector data, 3D pipe 144 waits until the value of the semaphore has been incremented. IDCT component 142 increments the semaphore value once IDCT component 142 receives the inverse transformed error data with the semaphore command. It should be noted that the semaphore value is incremented once the command to alter the semaphore value is received by IDCT component 142 and is performed regardless of whether the inverse transformed error data sent has been fully processed. Once the semaphore value has been incremented, 3D pipe 144 begins to process the motion compensation vector data, taking for granted that the related error data has already been processed. Once 3D pipe 144 has processed the motion compensation vector data, 3D pipe 144 can decrement the value of the semaphore, returning the semaphore to its original state, prior to increment by IDCT component 142. In one embodiment, altering the value of the semaphore includes incrementing the value of the semaphore so that, when incremented, the semaphore allows motion compensation vector data to be processed by 3D pipe 144. In a specific embodiment, the semaphore alternates between an asserted state in which the semaphore halts processing by 3D pipe 144, and an unasserted state in which the semaphore allows processing to be performed by 3D pipe 144.

It should be noted that if the increment commands related to the semaphore value are provided immediately after the transformed error data is issued, the increment in the semaphore value does not necessarily indicate the transformed error data has been fully processed. Accordingly, software driver 150 may need to account for the latency associated with processing in components 142 and 144. For example, software driver 150 may need to include "dummy" commands with the data to provide added latency to a receiving component, such as IDCT component 142. In another embodiment, the command to increment the semaphore value is provided at a later period of time after the IDCT coefficient sets are provided to IDCT component 142. In an alternate embodiment, a delay is applied by within hardware, such as graphics chip 140. A counter or timer (not shown) may be used by control 148 or IDCT component 142 before altering the semaphore value. Applying a delay for incrementing or altering the semaphore value insures that 3D pipe 144, does not grab error data values from memory, such as IDCT results 134, before they have been fully processed by IDCT component 142. It will be appreciated that unique identifiers, as described for the interrupt-based embodiment, may also be employed using semaphores in graphics chip 140. Identifiers corresponding to processed error data sets can be stored in memory, such as in identifier register 132. Control 148 can then be used to track the sets of processed data, and issue semaphore values to allow associated motion compensation data to be processed through 3D pipe 144. It will be appreciated that the selection of a semaphore-based implementation over an interrupt-based implementation may be made without departing from the spirit or scope of the present invention.

Figure 7:
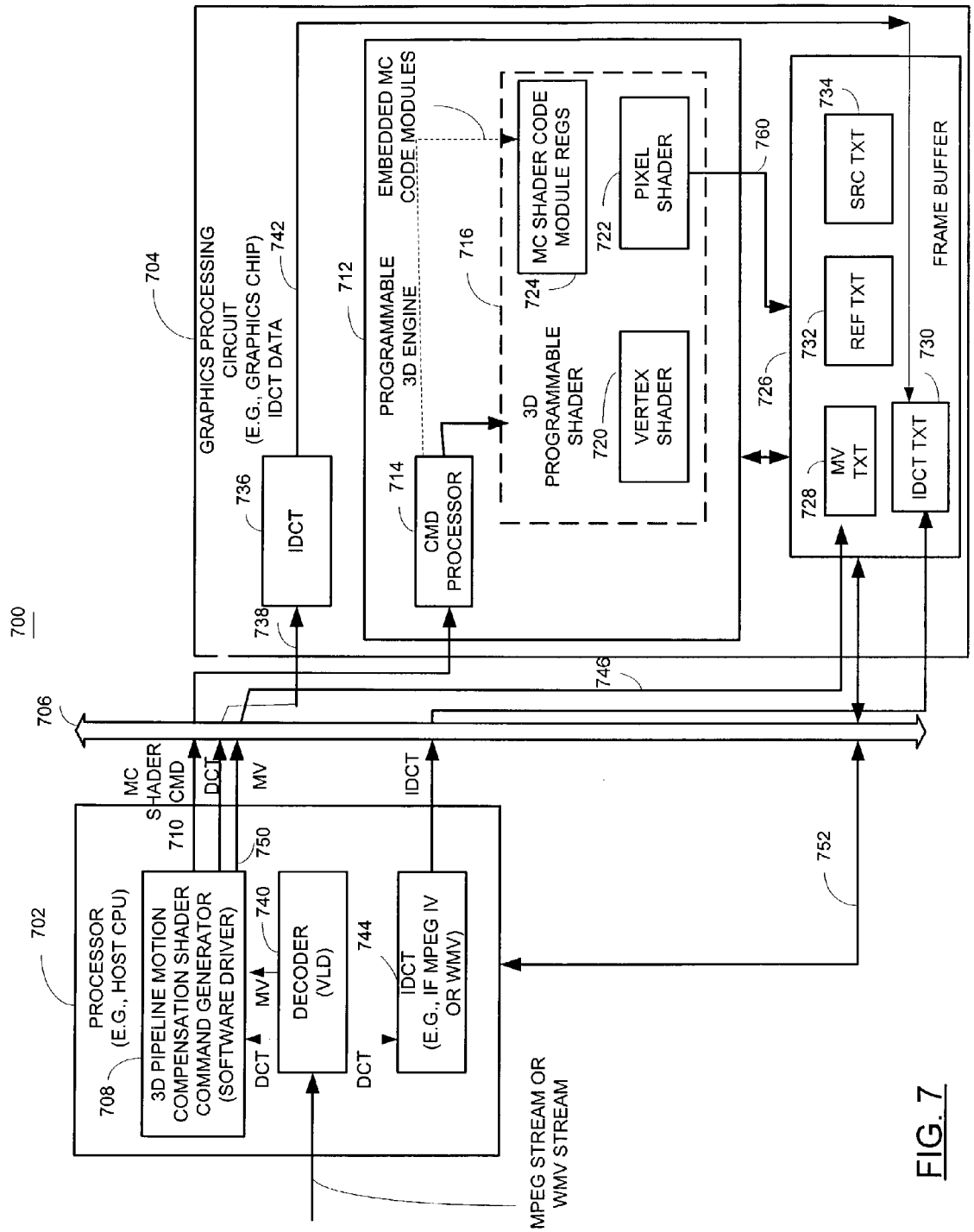
FIG. 7 illustrates one example of a graphics processing system that employs a graphics processing circuit in accordance with one embodiment of the invention.

FIG. 7 illustrates one example of a graphics processing system 700 that includes a processor 702, such as a host processor and a graphics processing circuit 704, such a graphics processor or integrated graphics chip that communicate via one or more buses 706. Processor 702 is programmed to execute one or more software drivers 708 that cause the processor 702 to generate a motion compensation shader command 710, such as a packet, that is received by the graphics processing circuit 704.

The graphics processing circuit 704 includes a programmable 3D engine 712 that includes a command processor 714 and a programmable shader 716 of a 3D pipeline. The other portions of the 3D pipeline are not shown for purposes of simplicity but are known to those for their skill in the art. The command processor 714 is operatively coupled to the programmable shader 716 to provide processed commands 718 that are in a suitable format understood by the programmable shader 716. The command processor 714 receives the motion compensation shader command 710 via bus 706.

The programmable shader 716 includes a programmable vertex shader 720, a programmable pixel shader 722 and motion compensation shader code module memory element 724 such as one or more registers. The programmable shader 716 may be of the type, for example, in an ATI 9700 PRO sold by ATI Technologies Inc., Thornhill, Ontario, Canada or other suitable type. The motion compensation shader code module memory element 724 is memory that is operatively coupled to the command processor 714 such that the command processor 714 can populate the registers with information embedded in the motion compensation shader command 710 as described below.

In this embodiment, the graphics processing circuit 704 includes frame buffer memory 726, however it will be recognized that the frame buffer memory 726 may be an external chip to the graphics processing circuit if desired. In any event, the frame buffer memory 726 is operatively coupled to the programmable shader 716 such that the pixel shader 722 can output decoded video into the frame buffer 726 for display an a suitable display device. In addition, the frame buffer memory 716 is operatively coupled to the programmable shader 716 to provide data necessary by the programmable shader 716 to carry out graphics 3D rendering operations on motion vector information to perform motion compensation prediction using a 3D pipeline. The memory 726 contains a motion vector texture map 728, an inverse transform texture map 730, a reference picture texture map 732 and a source image texture map 734. The programmable shader 716 decodes encoded video based at least in part on the motion compensation shader command 710 by among things, executing the embedded motion compensation code modules and at least two of the motion vector texture maps 728, the inverse transform texture map 730 and the reference picture texture map 732.

Depending upon whether or not an inverse transform circuit is needed, the graphics processing circuit 704 may also include an inverse transform circuit 736 such as an IDCT circuit that receives discrete cosine transform information 738 from a decoder 740 such as a variable length decoding block executing on processor 702. The inverse transform circuit 736 provides IDCT data 742 to the programmable shader 716. Alternatively, the processor 702 may include a software IDCT stage 744 that receives the DCT data 738 from software decoder 740 and outputs IDCT data 746 for the programmable shader 716. The software decoder 740 also outputs motion vector data 750, which is received by the programmable shader 716 through any suitable mechanism such as registers or any other suitable mechanism. The processor 702 is operatively coupled to the frame buffer memory 726 via one or more suitable buses 752 and 706. As such, the software driver 708 (and host processor 702) that operates as a 3D pipeline motion compensation shader command generator 710 may also define the motion vector texture map 728, inverse transform texture map 730, and a reference picture texture map 732 by assigning texture coordinates to motion vector data. The software driver 708 performs the requisite translations on data to reformat the data into texture maps to conform with formats understood by the programmable shader. The motion vector texture map 728 contains displacement information for the programmable shader to apply to default texture coordinates and obtain the final coordinates from which to fetch reference pixels.

Figure 8:
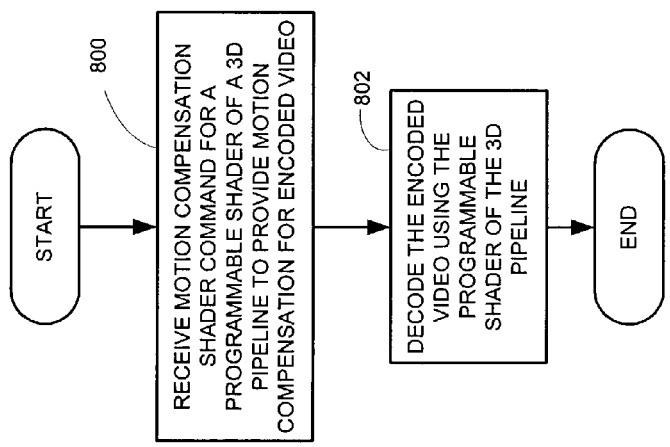
FIG. 8 is a flow chart illustrating one example of a video decoding method in accordance with one embodiment of the invention.

Referring to FIG. 8, in operation, the graphics processing circuit 704 receives the motion compensation shader command 710 for the programmable shader 3D pipeline 716 to provide motion compensation for encoded video as shown in block 800. As shown in block 802, the method includes decoding the encoded video using the programmable shader 716 of the 3D pipeline to produce the decoded video such as decoded macroblocks 760.

Figure 9:
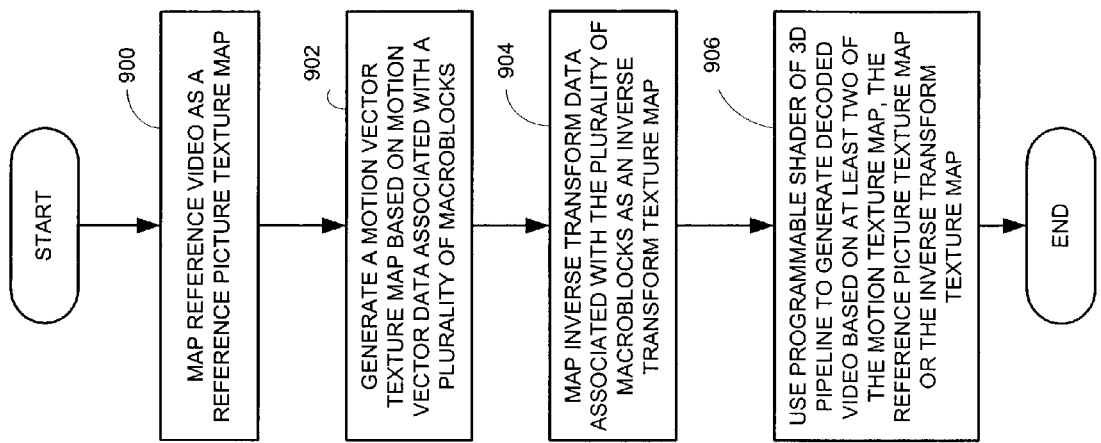
FIG. 9 is a flow chart illustrating one example of a method for decoding video in accordance with one embodiment of the invention.

Referring to FIG. 9, a method for decoding encoded video using the programmable shader 3D pipeline as presented. In block 900, the method includes, mapping reference video, such as a macroblock from an I-frame or P-frame that has been previously decoded as a reference picture texture map. This may be done, for example, by the software driver 708 executing on the processor 702. The software driver associates decoded video to a texture address base of the programmable 3D engine. The resulting reference picture texture map 732 is stored in frame buffer memory 726. The software driver 708 then sends a suitable command to inform the graphics processing circuit about the attributes of the newly defined texture in a conventional manner.

As shown in block 902, the method includes generating the motion vector texture map 728 based on motion vector data associated with one or more macroblocks. For example, the software driver 708 receives motion vector data 750 from the processor 702 via the decoder 740 and maps and stores the resulting motion vector information as the motion vector texture map 728 in frame buffer memory 726.

As shown in block 904, the method also includes mapping inverse transform data, such as that output from the IDCT block 744. This is done for a plurality of macroblocks such as on a per frame or per field basis, as the inverse transform texture map 730. This is also performed by the processor 702 under control of a software driver 708. As shown in block 906, the method includes using the programmable shader 716 to generate the coded video based on at least two of the newly defined and mapped texture maps that are motion vector prediction based information now in the form of texture map data so that the information may be readily processed by the 3D graphics pipeline.

By mapping motion vector information, inverse transform information and reference information as textures on a per macroblock and/or per field/frame basis, programmable 3D shader circuitry can operate on the information as though it were graphics information and as such dedicated motion compensation prediction hardware is no longer necessary.

The pixel shader 722 uses the motion vector texture map which is, for example, a group of values between zero and 1, the reference texture map and the IDCT texture map 730. The vertex shader 720 is passed macroblock corner information from the motion compensation shader command 710, for example 4 points that define a macroblock as 4 vertices. As such, the vertex shader operates on a macroblock as though it is a primitive. Destination vertex points are input to the vertex shader that correspond to 4 corners of a macroblock. As such a vertex shader and pixel shader are both used to carry out motion compensation prediction.

Figure 10:
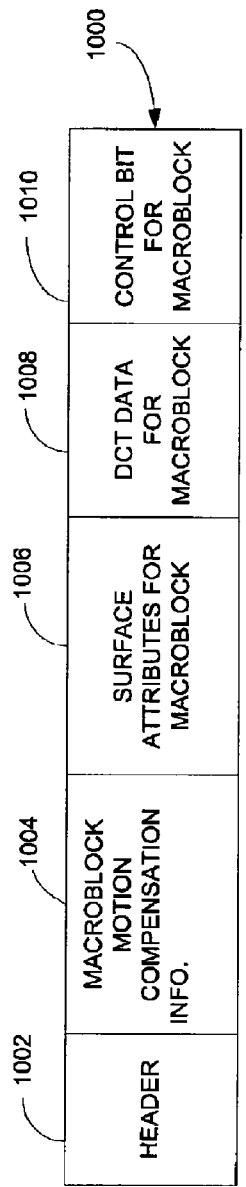
FIG. 10 is a diagram illustrating a prior art command processed by a graphics processing circuit to perform non-shader based motion compensation prediction.

FIG. 10 illustrates a prior art format of previously used commands for dedicated motion compensation hardware located in a 3D pipeline and is referred to as non-shader based compensation prediction. As shown, the non-shader based command 1000 included a header 1002, and a payload that included, for each macroblock, macroblock motion compensation data portion 1004, surface attributes in portion 1006 and as shown in portion 1008, discrete cosine transform data for a macroblock. As shown in portion 1010, one or more control bits were included for a macroblock. This information was stored in a motion compensation register set. As such the host processor needed to calculate the source of locations for motion compensation prediction and previous formats did not accommodate for all of the necessary prediction modes.

Figure 11:
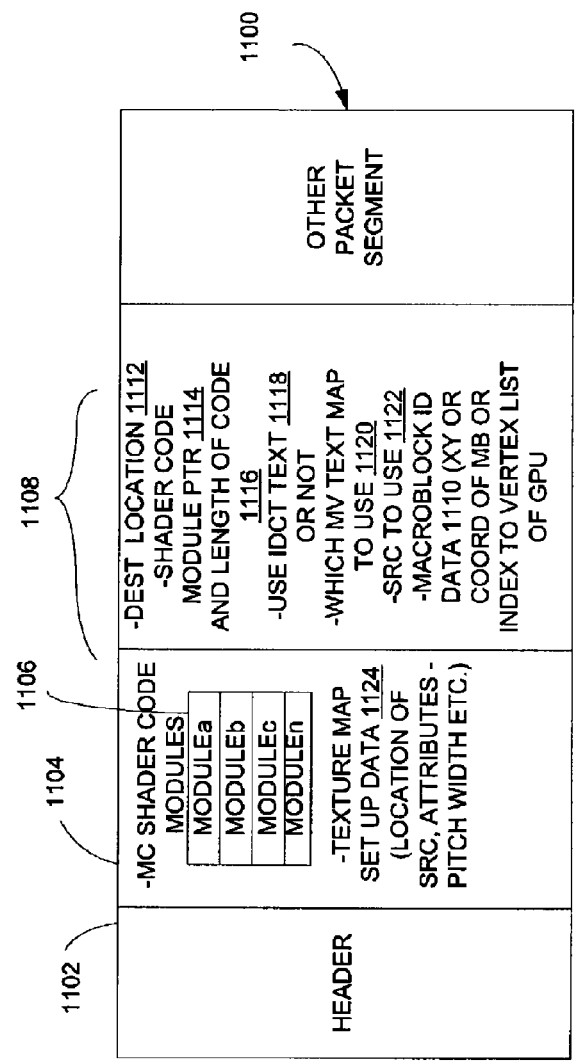
FIG. 11 is a diagram illustrating one example of a motion compensation shader command for a programmable shader of a 3D pipeline in accordance with one embodiment of the invention.

FIG. 11 illustrates one example of a novel motion compensation shader command 1100. Macroblocks with similar properties are submitted in one batch to minimize set up overhead. As a result, command size can be reduced and state changes in the 3D pipelines are minimized. The motion compensation shader command 1100 includes a header 702, a portion or segment 1104 containing a plurality of motion compensation shader control modules 1106 which is in the form of, for example, executable code, executable by the programmable shader 716. In one embodiment, the packet segment 1104 includes all of the modules necessary for a plurality of different prediction modes associated with at least a group of macroblocks such as one frame of field of macroblocks wherein different macroblocks may require different prediction modes. As such, in one embodiment, the motion compensation shader command 1100 contains enough information to facilitate the decoding of an entire field or frame of encoded video. The plurality of motion compensation shader code modules 1106 need only be communicated once since they may then be loaded in a compensation shader code module register 724. Subsequent commands or packets may then include pointers to point to different pre-stored code modules depending upon the prediction mode required for a given macroblock.

The motion compensation shader command 1100, or subsequent commands, includes another motion compensation mode packet segment 1108 that is unique, for example, for each motion compensation mode. For example, the motion compensation mode packet segment 1108 may contain information for all macroblocks that use the same motion compensation mode. In this example, the motion compensation mode packet segment 1108 contains data representing macroblock corners in the form of XY coordinates or an index to a vertex list of the graphics processing circuit referred to as macroblock ID data 1110. In addition, the motion compensation mode packet segment 1108 includes for each macroblock, the destination or location where the decoded macroblock will be stored, indicated as 1112. A shader code module pointer 1114 points to the appropriate pre-stored shader code module or modules that were embedded in the previous packet or in the segment 1104 that are stored in the motion compensation shader code module register 724. Data representing the length of the code 1116 may also be included. In addition, the segment 1108 includes data indicating whether to use the IDCT texture 730 for a given macroblock indicated as data 1118, data representing which motion vector texture 728 to use for given macroblock indicated as data 1120, which source texture or reference texture 732 to use indicated as data 1122, and any other suitable data.

The segment 1104, in addition to including the motion compensation shader code modules for all prediction modes, also includes in one embodiment, texture maps set-up data 1124 such as the location of a source field and macroblock, and its attributes such as the pitch, width and other known information relating to textures.

The motion compensation mode packet segment 1108 as noted includes the shader code module pointer 1114 and is also included in the packet that follows the shader code modules. The pointer 1114 is associated with a macroblock and causes the programmable shader 716 to execute one of the plurality of stored shader code modules 1106 that are stored in the motion compensation shader code module register 724 by the command processor 714 after the command 1100 is executed by the command processor 714. The index to the vertex list of the graphics processor is repeating (there may be multiple entries of indices in one motion compensation mode packet segment 1108 data structure. Furthermore, the motion compensation mode packet segment 1108 repeats in the packet 1100.

As noted, the packet 1100 is a frame based packet that contains in this embodiment, all shader code modules needed for predicting motion for the entire field or frame of encoded video. As new fields or frames need to be decoded, another command may be sent that includes all shader code modules for a new field or frame with pointers for each different prediction mode for different macroblocks in the field. However, if the code modules do not change then they need not be resent.

The macroblock ID data 1110 may be data, for example, representing a static vertex table that contains vertex data associated with all vertices of the macroblocks that use the same shader code module to determine motion compensation for field or frame or data representing an index to a static vertex table. Each macroblock is represented by four vertices representing the corners of the macroblock.

The reason the above packet format to include the or embed the actual program or shader code when a motion compensation command, decides if a packet band with associated with the commands can be reduced thereby improving efficiency between the host processor and the graphics processing circuit. In addition, the packets are smaller, the host processor can operate quicker since it does not need to generate larger packets. The first packet includes the shader codes to pre-load the command processor of the graphics processing unit.

Figure 12:
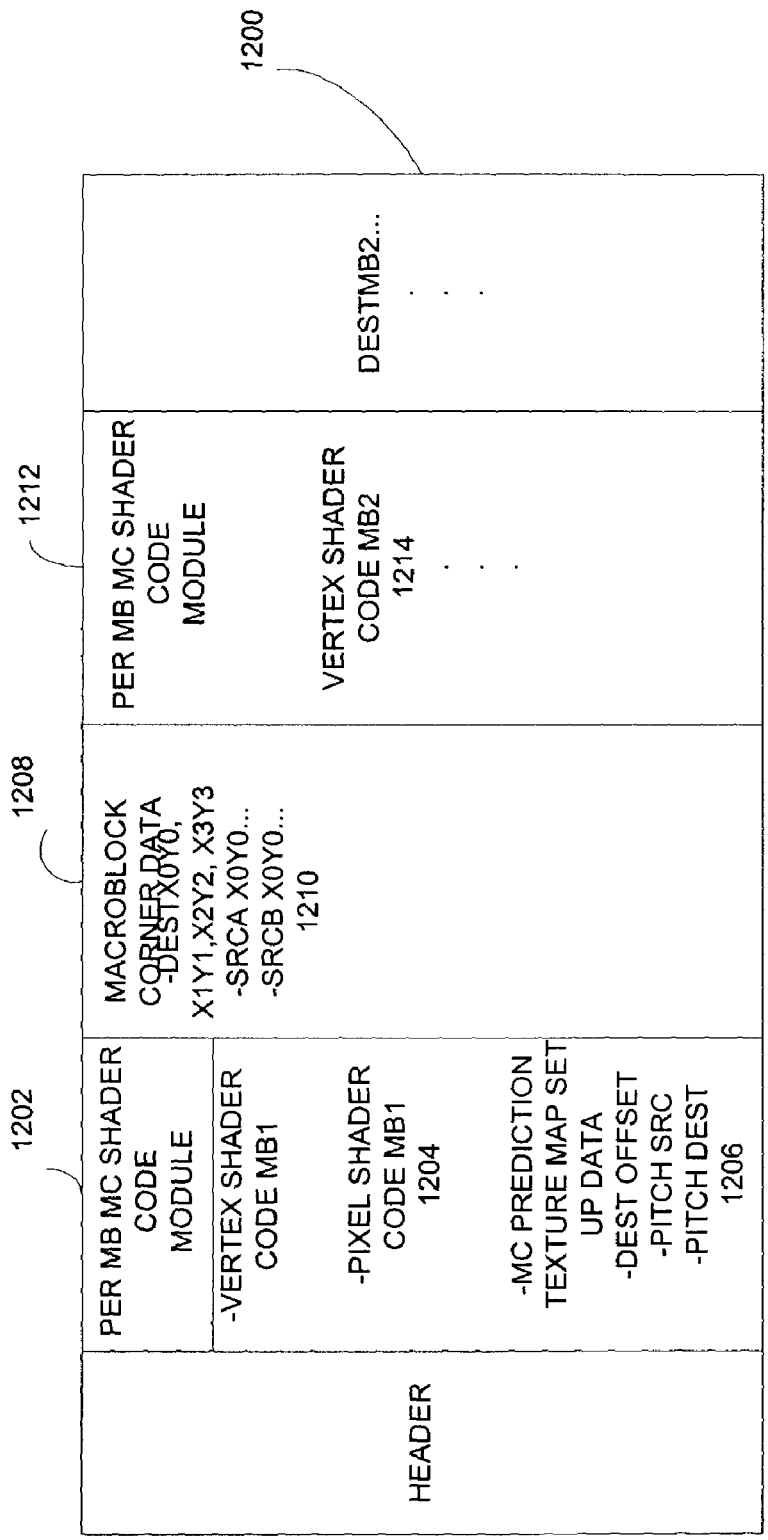
FIG. 12 is a diagram illustrating another example of a motion compensation shader command for a programmable shader of a 3D pipeline in accordance with another embodiment of the invention.

FIG. 12 illustrates another embodiment of a motion compensation shader command 1200 that is different from the motion compensator shader command of FIG. 11 in that, among other things, the motion compensation shader code of each motion compensation mode is sent individually as that mode of compensation is required. In contrast, the motion compensation shader command 1100 includes the motion compensator shader code module 1106 for all motion compensation modes in a single command to pre-load the programmable shader registers that pointers could subsequently point to in later commands or packet segments. As such, the motion compensation shader command 1200 includes a per macroblock motion compensation shader code module 1202 which includes vertex shader code for macroblock 1 and pixel shader code for macroblock 1 indicated as data 1204. In addition, the motion compensation prediction texture map set-up data is also included for the particular macroblock which may include, for example, a destination, an offset, the pitch of the source, the pitch of the destination and other suitable information indicated as data 1206. In another segment 1208, the command 1200 includes macroblock corner data representing four corners of the macroblock including the destination coordinates for where the corresponding decoded macroblock will be stored as well as the source corners for one or more macroblocks indicated as data 1210. The command 1200 may then include in another segment 1212, similar data for another macroblock of a frame such as macroblock 2 and as such additional vertex shader code for another macroblock indicated as data 1214 is sent as another packet segment. As compared to the format of FIG. 11, this format may take additional time and may result in larger packets and hence may be a little more inefficient from the host processor's perspective. However, such a command format may still be used to allow decoding of encoded video using a programmable shader of a 3D pipeline in contrast to previously known systems.

Figure 13:
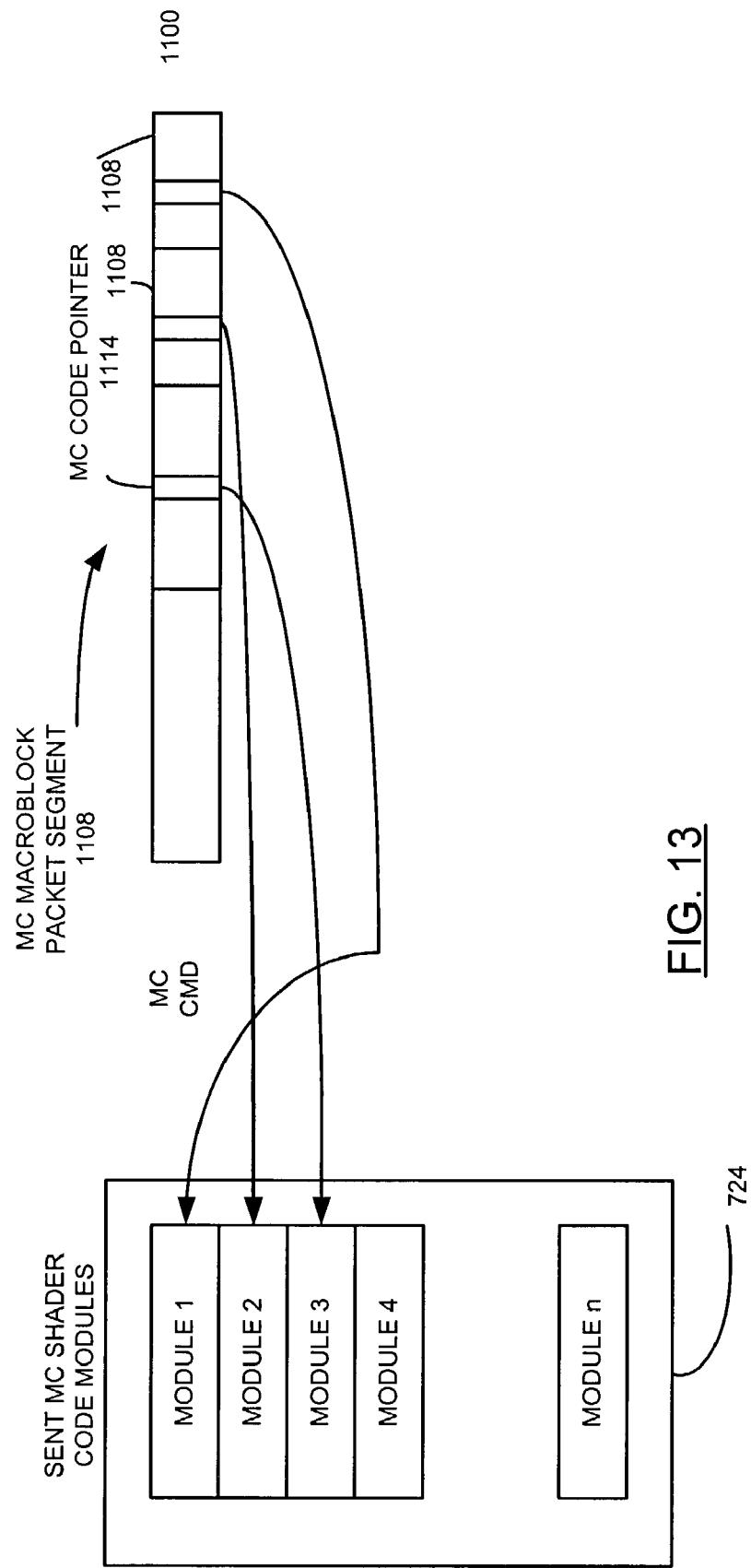
FIG. 13 diagrammatically illustrates a motion compensation shader command having an indexing configuration in accordance with one embodiment of the invention.

FIG. 13 is another representation of the motion compensation code pointer 1114 associated with each motion compensation macroblock packet segment 1108 of a command 1100 and is shown pointing to motion compensation shader code module 3, 2 and 1, respectively, that is stored in a register such as the motion compensation shader code module register 724.

Figure 14:
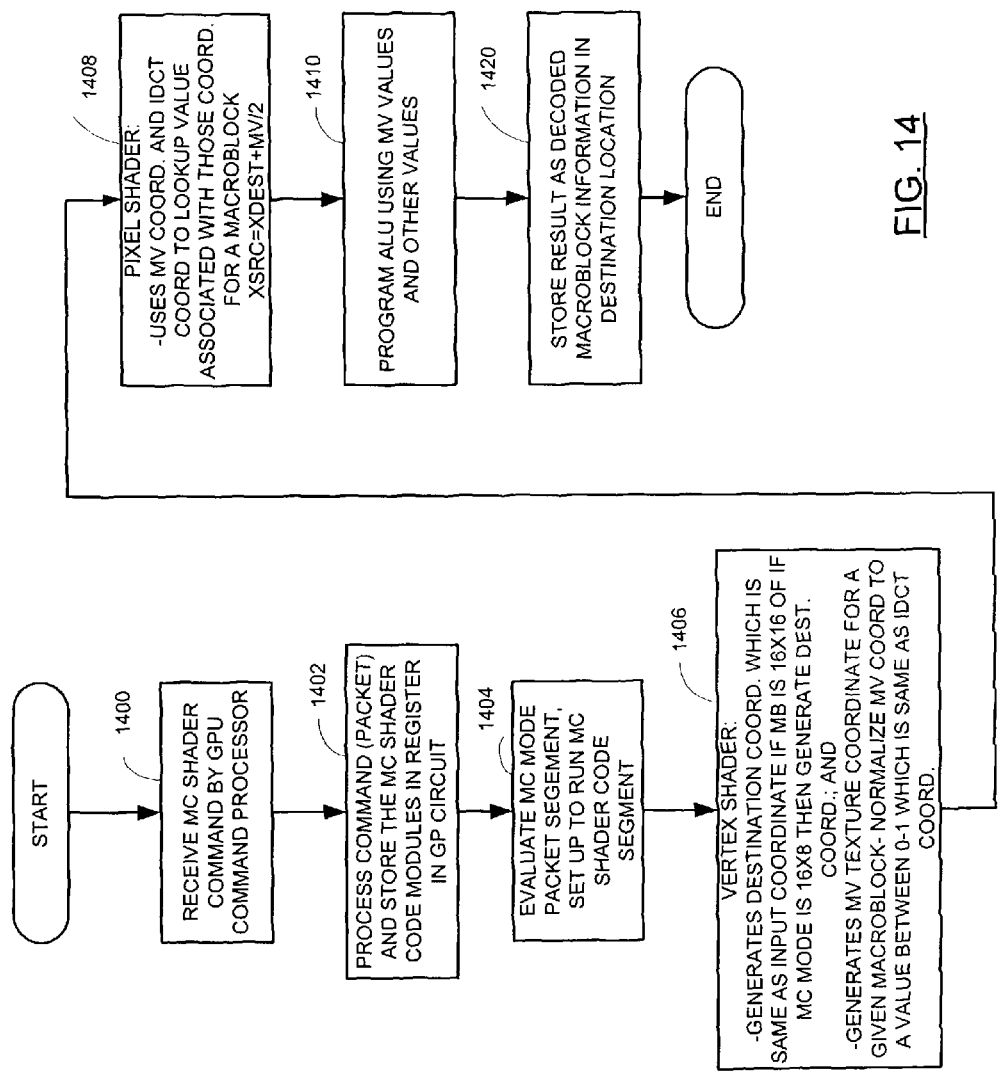
FIG. 14 is a flow chart illustrating one example of a method for decoding video in accordance with one embodiment of the invention.

FIG. 14 illustrates a method that is carried out, for example, by the vertex shader 720 and pixel shader 722 in accordance with one embodiment of the invention. In step 1400, the command processor 714 receives the motion compensation shader command and as shown in block 1402 processes the command and stores the motion compensation shader code modules embedded in the command (indicated as 1106) in the motion compensation shader code module register 724. As shown in block 1404, the command processor 714 continues to evaluate the motion compensation mode packet segment to set-up and run the motion compensation shader code. As shown in block 1406, the vertex shader 720 generates destination coordinates of a texture which, in this example, may be the same as the input coordinates if a macroblock is a 16×16 macroblock or if the macroblock mode indicates that the macroblock shows a different size such as 16×8, then the vertex shader generates the destination coordinates corresponding to the different texture size. The vertex shader then generates a motion vector texture coordinate for a given macroblock and normalizes the motion vector coordinate to a value between 0 and 1 which is the same range as an IDCT coordinate.

As shown in block 1408, the pixel shader 722 uses the motion vector coordinates an IDCT coordinates generated by the vertex shader to look up a value associated with those coordinates for a macroblock. By way of example, a motion vector value may be equivalent, for example, to the source X coordinate which may be equal to the destination X coordinate plus the motion vector value divided by 2. As shown in block 1410, the programmable shader 716 programs an arithmetic logic unit (ALU) which is part of the programmable shader, with motion vector values and other necessary values (e.g., rounding control values) to determine, for example, a source location, i.e., the texture location to mix with the DCT data (if present). As shown in block 1420, the pixel shader after determining the pixel values then stores the result of decoded macroblock information 760 in the destination location for the macroblock. As such, a shader pipe is used to handle, for example, MPEG acceleration in a much smaller number of texture commands and ALU commands. Code for all prediction modes can be pre-loaded to speed up prediction mode switching when different prediction modes are required during a decode process. The same mechanism may be extended and applied on other video coding formats, some typical examples are MPEG IV and WMV (from Microsoft Inc.).

As noted above, the graphics processing circuit 704 may be discreet logic, hardware, firmware, or any suitable combination thereof and the vertex shaders and pixel shader 720 and 722 may be, for example, firmware based shades that execute the motion compensation shader code modules in the programmable shader 716. It will also be recognized that the various steps that describe the above may be done in any suitable order depending upon the particular desired efficiency of a particular environment.

In the preceding detailed description of the preferred embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims.

What is claimed is:

1. A video decoding method comprising:
receiving a processor executable motion compensation shader command for a programmable shader of a 3D pipeline, to provide motion compensation for encoded video;
decoding the encoded video using the programmable shader of the 3D pipeline in response to executing the motion compensation shader command;
wherein the motion compensation shader command for the programmable shader includes a 3D command that contains data representing macroblock corners associated with a plurality of video macroblocks and wherein the same 3D command contains a plurality of embedded shader code modules executable by the programmable shader necessary for different prediction modes associated with at least some of the plurality of video macroblocks; and
wherein decoding comprises executing one or more of the embedded executable shader code modules from the 3D command.

2. The method of claim 1 including storing the executable shader code modules from the motion compensation shader command in response to executing the motion compensation shader command and wherein the motion compensation shader command contains at least one pointer associated with at least one macroblock and wherein the at least one pointer causes the programmable shader to execute one of the plurality of stored shader code modules.

3. The method of claim 1 wherein the step of decoding the encoded video using the programmable shader of the 3D pipeline includes:
mapping reference video as a reference picture texture map;
generating a motion vector texture map based on motion vector data associated with a plurality of macroblocks;
mapping inverse transform data associated with the plurality of macroblocks as a inverse transform texture map; and
using the programmable shader to generate decoded video based on at least two of the motion vector texture map, the reference picture texture map and the inverse transform texture map.

4. The method of claim 1 wherein the motion compensation shader command is comprised of a packet that is a frame based packet that at least contains all shader code modules needed for predicting motion for an entire field or frame of encoded video.

5. The method of claim 3 wherein the inverse transform map represents IDCT data associated with motion compensation data for video macroblocks.

6. The method of claim 1 wherein the motion compensation shader command include data representing a static vertex table containing vertex data associated with all vertices of macroblocks used to determine motion compensation for a field or frame, or data representing an index to the static vertex table.

7. A graphics processing circuit comprising:
a programmable shader of a 3d pipeline;
a command processor, operatively coupled to the programmable shader and operative to receive and execute at least one motion compensation shader command for the programmable shader;

memory, operatively coupled to the command processor, containing stored motion compensation shader code modules embedded in the motion compensation shader command;

frame buffer memory, operatively coupled to the programmable shader, containing at least two of a motion vector texture map, an inverse transform texture map, and a reference picture texture map, wherein the programmable shader decodes encoded video based at least in part on the executed motion compensation shader command and at least two of the motion vector texture map, the inverse transform texture map, and the reference picture texture map;

wherein the motion compensation shader command for the programmable shader includes a 3D command that contains data representing macroblock corners associated with a plurality of video macroblocks and wherein the same 3D command contains a plurality of embedded shader code modules executable by the programmable shader necessary for different prediction modes associated with at least some of the plurality of video macroblocks; and wherein the programmable shader decodes encoded video using at least one of the embedded shader code modules.

8. The circuit of claim 7 wherein the motion compensation shader command contains at least one pointer associated with at least one macroblock and wherein the at least one pointer causes the programmable shader to execute one of the plurality of stored shader code modules.

9. The circuit of claim 7 wherein the packet is a frame based packet that at least contains all shader code modules needed for predicting motion for an entire field or frame of encoded video.

10. The circuit of claim 9 wherein the inverse transform texture map represents IDCT data associated with motion compensation data for video macroblocks.

11. The circuit of claim 7 wherein the motion compensation shader command include data representing a static vertex table containing vertex data associated with all vertices of macroblocks used to determine motion compensation for a field or frame and data representing an index to the static vertex table.

12. A graphics processing system comprising:
a first processor programmed to execute a software driver that causes the first processor to generate a motion compensation shader command for a programmable shader of a 3D pipeline to effect motion compensation for encoded video;
a graphics processing circuit including:
the programmable shader of a 3d pipeline;
a command processor, operatively coupled to the programmable shader and operative to receive and execute at least one motion compensation shader command for the programmable shader;
memory, operatively coupled to the command processor, containing motion compensation shader code modules embedded in the motion compensation shader command;
frame buffer memory, operatively coupled to the programmable shader, containing at least two of a motion vector texture map, an inverse transform texture map, and a reference picture texture map;
wherein the programmable shader decodes encoded video based at least in part on the executed motion compensation shader command and at least two of the motion vector texture map, the inverse transform texture map, and the reference picture texture map;

wherein the motion compensation shader command for the programmable shader includes a 3D command that contains data representing macroblock corners associated with a plurality of video macroblocks and wherein the same 3D command contains data representing a plurality of shader code modules necessary for different prediction modes associated with at least some of the plurality of video macroblocks; and wherein the programmable shader decodes encoded video using at least one of the embedded shader code modules.

13. The system of claim 12 wherein the motion compensation shader command contains at least one pointer associated with at least one macroblock and wherein the at least one pointer causes the programmable shader to execute one of the plurality of stored shader code modules.

14. The system of claim 13 wherein motion compensation shader command is comprised of a packet that is a frame based packet that at least contains all shader code modules needed for predicting motion for an entire field or frame of encoded video.

15. The system of claim 12 wherein the motion compensation shader command include data representing a static vertex table containing vertex data associated with all vertices of macroblocks used to determine motion compensation for a field or frame and data representing an index to the static vertex table.

16. A video decoding method comprising:
decoding encoded video using a programmable shader based on a processor executable motion compensation shader command to provide motion compensation for the encoded video;
providing the motion compensated video for display or further processing; and
wherein the motion compensation shader command for the programmable shader includes a 3D command that contains data representing macroblock corners associated with a plurality of video macroblocks and wherein the same 3D command contains a plurality of embedded shader code modules necessary for different prediction modes associated with at least some of the plurality of video macroblocks.

17. The method of claim 16 including storing the shader code modules from the motion compensation shader command and wherein the motion compensation shader command contains at least one pointer associated with at least one macroblock and wherein the at least one pointer causes the programmable shader to execute one of the plurality of stored shader code modules.

18. The method of claim 16 wherein decoding the encoded video using the programmable shader includes:
mapping reference video as a reference picture texture map;
generating a motion vector texture map based on motion vector data associated with a plurality of macroblocks;
mapping inverse transform data associated with the plurality of macroblocks as a inverse transform texture map; and
using the programmable shader to generate decoded video based on at least two of the motion vector texture map, the reference picture texture map and the inverse transform texture map.

19. The method of claim 16 wherein the packet is a frame based packet that at least contains all shader code modules needed for predicting motion for an entire field or frame of encoded video.

20. The method of claim 18 wherein the inverse transform map represents IDCT data associated with motion compensation data for video macroblocks.

21. The method of claim 16 wherein the motion compensation shader command include data representing a static vertex table containing vertex data associated with all vertices of macroblocks used to determine motion compensation for a field or frame, or data representing an index to the static vertex table.

22. The method of claim 16 comprising generating the motion compensation command for the programmable shader.

23. The method of claim 16 comprising generating the motion compensation command by a first processor and sending the motion compensation command to a second processor that comprises the programmable shader.

24. A device comprising:
a graphics processing circuit operative to decode encoded video using a programmable shader based on a processor executable motion compensation shader command to provide motion compensation for the encoded video; and
wherein the motion compensation shader command for the programmable shader includes a 3D command that contains data representing macroblock corners associated with a plurality of video macroblocks and wherein the same 3D command contains a plurality of embedded shader code modules necessary for different prediction modes associated with at least some of the plurality of video macroblocks.

25. The device of claim 24 including memory operatively coupled with the graphics processing circuit, that stores the shader code modules from the motion compensation shader command and wherein the motion compensation shader command contains at least one pointer associated with at least one macroblock and wherein the at least one pointer causes the programmable shader to execute one of the plurality of stored shader code modules.

26. The device of claim 24 wherein graphics processing circuit decodes by:
mapping reference video as a reference picture texture map;
generating a motion vector texture map based on motion vector data associated with a plurality of macroblocks;
mapping inverse transform data associated with the plurality of macroblocks as a inverse transform texture map; and
using the programmable shader to generate decoded video based on at least two of the motion vector texture map, the reference picture texture map and the inverse transform texture map.

27. The device of claim 26 wherein the inverse transform map represents IDCT data associated with motion compensation data for video macroblocks.

28. The device of claim 24 wherein the motion compensation shader command includes data representing a static vertex table containing vertex data associated with all vertices of macroblocks used to determine motion compensation for a field or frame, or data representing an index to the static vertex table.

29. A video decoding method comprising:
generating a motion compensation command for a programmable shader based on encoded video data wherein the motion compensation shader command for the programmable shader includes a 3D command that contains data representing macroblock corners associated with a plurality of video macroblocks and wherein the same 3D command contains a plurality of embedded shader code modules necessary for different prediction modes associated with at least some of the plurality of video macroblocks;
decoding encoded video using the programmable shader based on a motion compensation shader command to provide motion compensation for the encoded video; and
providing the motion compensated video for display or further processing.

30. A video decoding method comprising:
generating a motion compensation command for a programmable shader based on encoded video data representing macroblock corners associated with a plurality of video macroblocks and a plurality of embedded shader code modules necessary for different prediction modes associated with at least some of the plurality of video macroblocks; and
communicating the motion compensation command to the programmable shader.

31. The video decoding method of claim 30 wherein said motion compensation command comprises data corresponding to vertices.

32. The video decoding method of claim 31 wherein said data corresponding to vertices comprises one of: vertex data, coordinates of a macroblock and an index to a vertex list.

33. The video decoding method of claim 30 wherein said encoded video data comprises MPEG video data.

34. The video decoding method of claim 33 wherein said MPEG video data comprises MPEG-2 data.

35. The video decoding method of claim 33 wherein said MPEG video data comprises MPEG-4 data.

36. The video decoding method of claim 30 comprising:
mapping reference video as a reference picture texture map;
generating a motion vector texture map based on motion vector data associated with a plurality of macroblocks;
mapping inverse transform data associated with the plurality of macroblocks as a inverse transform texture map; and
using the programmable shader to generate decoded video based on at least two of the motion vector texture map, the reference picture texture map and the inverse transform texture map.

37. A computer readable medium containing executable instructions that when executed by one or more processors causes the one or more processors to:
(a) generate a motion compensation shader command that comprises a 3D command that contains data representing macroblock corners associated with a plurality of video macroblocks and wherein the same 3D command contains a plurality of embedded shader code modules necessary for different prediction modes associated with at least some of the plurality of video macroblocks; and
(b) communicate said motion compensation shader command to a graphics processing circuit.

38. The computer readable medium of claim 37 wherein said instructions comprise a video application.

39. The computer readable medium of claim 38 wherein said video application comprises at least one of: player software; a television tuner, an application programming interface and video decoding software.

40. An apparatus for video decoding comprising:
a motion compensation command generator which generates a motion compensation shader command based on encoded video data wherein the command comprises a 3D command that contains data representing macroblock corners associated with a plurality of video macroblocks and wherein the same 3D command contains data representing a plurality of shader code modules necessary for different prediction modes associated with at least some of the plurality of video macroblocks; and communicating the motion compensation command to a graphics processing circuit.

41. The apparatus of claim 40 wherein said motion compensation command generator comprises at least a portion of a processor.

42. The apparatus of claim 41 further comprising a video application executing on said processor.

43. The apparatus of claim 42 wherein said video application executing on said processor comprises one or more of: player software; a television tuner, an application programming interface and video decoding software.

* * * * *